US011249196B2

(12) United States Patent
Lau et al.

(10) Patent No.: US 11,249,196 B2
(45) **Date of Patent: *Feb. 15, 2022**

(54) METHOD AND APPARATUS FOR INTELLIGENT ACQUISITION OF POSITION INFORMATION

(71) Applicant: IpVenture, Inc., San Jose, CA (US)

(72) Inventors: Chung Lau, Sunnyvale, CA (US); C. Douglass Thomas, Saratoga, CA (US)

(73) Assignee: IpVenture, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/129,726

(22) Filed: Dec. 21, 2020

(65) Prior Publication Data

US 2021/0223404 A1 Jul. 22, 2021

Related U.S. Application Data

(63) Continuation of application No. 16/658,258, filed on Oct. 21, 2019, now Pat. No. 11,041,960, which is a continuation of application No. 15/700,498, filed on Sep. 11, 2017, now Pat. No. 10,761,214, which is a continuation of application No. 14/875,844, filed on Oct. 6, 2015, now Pat. No. 9,759,817, which is a continuation of application No. 13/802,574, filed on Mar. 13, 2013, now Pat. No. 9,182,238, which is a (Continued)

(51) Int. Cl.

| | |
|---|---|
| ***G01S 19/34*** | (2010.01) |
| ***G06F 1/329*** | (2019.01) |
| ***G01C 21/20*** | (2006.01) |
| ***H04W 64/00*** | (2009.01) |
| ***G06F 1/3212*** | (2019.01) |
| ***G01S 19/42*** | (2010.01) |

(52) U.S. Cl.

CPC .............. *G01S 19/34* (2013.01); *G01C 21/20* (2013.01); *G01S 19/42* (2013.01); *G06F 1/329* (2013.01); *G06F 1/3212* (2013.01); *H04W 64/00* (2013.01)

(58) Field of Classification Search

USPC .......................................................... 701/149

See application file for complete search history.

(56) References Cited

U.S. PATENT DOCUMENTS 3,975,941 A 8/1976 Smith
4,719,920 A 1/1988 Alt et al.

(Continued)

FOREIGN PATENT DOCUMENTS

EP 0 874 529 A2 10/1998
EP 1 037 447 A2 9/2000

(Continued)

OTHER PUBLICATIONS

Notice of Allowance for U.S. Appl. No. 16/658,258, dated Jan. 19, 2021.

(Continued)

*Primary Examiner* — Tyler D Paige

(57) ABSTRACT

Improved methods and systems for position acquisition and/or monitoring are disclosed. The position acquisition and/or monitoring can be performed with improved intelligence so that data acquisition, transmission and/or processing is reduced. As a result, the position acquisition and/or monitoring is able to be performed in a power efficient manner.

32 Claims, 9 Drawing Sheets

Related U.S. Application Data continuation of application No. 12/381,776, filed on Mar. 17, 2009, now Pat. No. 9,074,903, which is a continuation of application No. 11/124,475, filed on May 9, 2005, now Pat. No. 8,285,484, which is a continuation of application No. 10/397,473, filed on Mar. 26, 2003, now Pat. No. 6,975,941.

(60) Provisional application No. 60/444,198, filed on Jan. 30, 2003, provisional application No. 60/418,491, filed on Oct. 15, 2002, provisional application No. 60/404,645, filed on Aug. 19, 2002, provisional application No. 60/375,998, filed on Apr. 24, 2002.

(56) References Cited

U.S. PATENT DOCUMENTS 5,115,223 A 5/1992 Moody
5,337,579 A 8/1994 Saia, III et al.
5,347,274 A 9/1994 Hassett
5,353,034 A 10/1994 Sato et al.
5,384,824 A 1/1995 Alvesalo
5,389,934 A 2/1995 Kass
5,394,333 A 2/1995 Kao
5,400,020 A 3/1995 Jones et al.
5,422,814 A 6/1995 Sprague et al.
5,422,816 A 6/1995 Sprague et al.
5,448,773 A 9/1995 McBurney et al.
5,461,365 A 10/1995 Schlager et al.
5,470,233 A 11/1995 Fruchterman et al.
5,491,486 A 2/1996 Welles, II et al.
5,512,902 A 4/1996 Guthrie et al.
5,515,858 A 5/1996 Myllymaki
5,517,199 A 5/1996 DiMattei
5,528,247 A 6/1996 Nonami
5,528,518 A 6/1996 Bradshaw et al.
5,532,690 A 7/1996 Hertel
5,539,748 A 7/1996 Raith
5,541,845 A 7/1996 Klein
5,543,789 A 8/1996 Behr et al.
5,550,551 A 8/1996 Alesio
5,563,606 A 10/1996 Wang
5,568,119 A 10/1996 Schipper et al.
5,570,412 A 10/1996 LeBlanc
5,576,716 A 11/1996 Sadler
5,592,173 A 1/1997 Lau et al.
5,598,460 A 1/1997 Tendler
5,604,708 A 2/1997 Helms et al.
5,608,909 A 3/1997 Atkinson et al.
5,623,260 A 4/1997 Jones
5,623,418 A 4/1997 Rostoker
5,627,517 A 5/1997 Theimer et al.
5,629,678 A 5/1997 Gargano et al.
5,633,874 A 5/1997 Diachina et al.
5,650,770 A 7/1997 Schlager et al.
5,652,570 A 7/1997 Lepkofker
5,673,692 A 10/1997 Schulze et al.
5,686,888 A 11/1997 Welles, II et al.
5,710,551 A 1/1998 Ridgeway
5,712,619 A 1/1998 Simkin
5,731,757 A 3/1998 Layson, Jr.
5,731,788 A 3/1998 Reeds
5,742,233 A 4/1998 Hoffman et al.
5,751,245 A 5/1998 Janky et al.
5,771,001 A 6/1998 Cobb
5,771,455 A 6/1998 Kennedy, III et al.
5,774,876 A 6/1998 Woolley et al.
5,786,789 A 7/1998 Janky
5,797,091 A 8/1998 Clise et al.
5,806,018 A 9/1998 Smith et al.
5,808,565 A 9/1998 Matta et al.
RE35,920 E 10/1998 Sorden et al.
5,825,283 A 10/1998 Camhi
5,826,195 A 10/1998 Westerlage et al.
5,828,953 A 10/1998 Kawase
5,835,907 A 11/1998 Newman
5,841,352 A 11/1998 Prakash
5,844,862 A 12/1998 Cocatre-Zilgien
5,850,196 A 12/1998 Mowers
5,852,775 A 12/1998 Hidary
5,861,841 A 1/1999 Gildea et al.
5,864,315 A 1/1999 Welles, II et al.
5,883,594 A 3/1999 Lau
5,889,770 A 3/1999 Jokiaho et al.
5,892,454 A 4/1999 Schipper et al.
5,894,266 A 4/1999 Wood, Jr. et al.
5,902,347 A 5/1999 Backman et al.
5,905,461 A 5/1999 Neher
5,910,799 A 6/1999 Carpenter et al.
5,913,078 A 6/1999 Kimura et al.
5,917,433 A 6/1999 Keillor et al.
5,918,180 A 6/1999 Dimino
5,928,309 A 7/1999 Korver et al.
5,938,721 A 8/1999 Dussell et al.
5,940,004 A 8/1999 Fulton
5,948,040 A 9/1999 DeLorme et al.
5,948,043 A 9/1999 Mathis
5,949,812 A 9/1999 Turney et al.
5,950,125 A 9/1999 Buhrmann et al.
5,959,575 A 9/1999 Abbott
5,959,577 A 9/1999 Fan et al.
5,963,130 A 10/1999 Schlager et al.
5,982,285 A 11/1999 Bueche et al.
5,982,807 A 11/1999 Snell
5,983,108 A 11/1999 Kennedy, III et al.
5,983,158 A 11/1999 Suzuki et al.
5,991,690 A 11/1999 Murphy
5,995,849 A 11/1999 Williams et al.
6,002,363 A 12/1999 Krasner
6,002,982 A 12/1999 Fry
6,009,319 A 12/1999 Khullar et al.
6,013,007 A 1/2000 Root et al.
6,014,080 A 1/2000 Layson, Jr.
6,014,090 A 1/2000 Rosen et al.
6,014,628 A 1/2000 Kovarik, Jr.
6,018,704 A 1/2000 Kohli et al.
6,023,241 A 2/2000 Clapper
6,031,496 A 2/2000 Kuittinen et al.
6,032,051 A 2/2000 Hall et al.
6,034,622 A 3/2000 Levine
6,052,646 A 4/2000 Kirkhart et al.
6,052,696 A 4/2000 Euler et al.
6,054,928 A 4/2000 Lemelson et al.
6,064,336 A 5/2000 Krasner
6,067,018 A 5/2000 Skelton et al.
6,067,044 A 5/2000 Whelan et al.
6,067,082 A 5/2000 Enmei
6,072,396 A 6/2000 Gaukel
6,075,987 A 6/2000 Camp, Jr. et al.
6,078,290 A 6/2000 McBurney et al.
6,083,248 A 7/2000 Thompson
6,083,353 A 7/2000 Alexander, Jr.
6,085,090 A 7/2000 Yee et al.
6,094,168 A 7/2000 Duffett-Smith et al.
6,094,642 A 7/2000 Stephenson et al.
6,100,670 A 8/2000 Levesque
6,100,806 A 8/2000 Gaukel
6,101,710 A 8/2000 Selinger et al.
6,104,334 A 8/2000 Allport
6,111,538 A 8/2000 Schuchman et al.
6,111,540 A 8/2000 Krasner
6,115,595 A 9/2000 Rodal et al.
6,121,921 A 9/2000 Ishigaki
6,125,325 A 9/2000 Kohli et al.
6,131,067 A 10/2000 Girerd et al.
6,140,863 A 10/2000 Fujisawa
6,140,957 A 10/2000 Wilson et al.
6,141,570 A 10/2000 O'Neill, Jr. et al.
6,144,303 A 11/2000 Federman
6,148,280 A 11/2000 Kramer
6,154,422 A 11/2000 Shinkawa et al.
6,163,696 A 12/2000 Bi et al.
6,169,902 B1 1/2001 Kawamoto
6,171,264 B1 1/2001 Bader

(56) References Cited

U.S. PATENT DOCUMENTS 6,172,640 B1 1/2001 Durst et al.
6,175,616 B1 1/2001 Light et al.
6,198,390 B1 3/2001 Schlager et al.
6,198,431 B1 3/2001 Gibson
6,198,930 B1 3/2001 Schipper
6,199,045 B1 3/2001 Giniger et al.
6,204,807 B1 3/2001 Odagiri et al.
6,208,934 B1 3/2001 Bechtolsheim et al.
6,212,133 B1 4/2001 McCoy et al.
6,225,944 B1 5/2001 Hayes
6,226,622 B1 5/2001 Dabbiere
6,231,519 B1 5/2001 Blants et al.
6,232,916 B1 5/2001 Grillo et al.
6,236,358 B1 5/2001 Durst et al.
6,238,337 B1 5/2001 Kambhatla et al.
6,243,039 B1 6/2001 Elliot
6,243,660 B1 6/2001 Hsu et al.
6,246,376 B1 6/2001 Bork et al.
6,252,543 B1 6/2001 Camp
6,252,544 B1 6/2001 Hoffberg
6,259,944 B1 7/2001 Margulis et al.
6,263,280 B1 7/2001 Stingone, Jr.
6,266,612 B1 7/2001 Dussell et al.
6,272,457 B1 8/2001 Ford et al.
6,278,936 B1 8/2001 Jones
6,281,797 B1 8/2001 Forster et al.
6,282,362 B1 8/2001 Murphy et al.
6,282,495 B1 8/2001 Kirkhart et al.
6,285,314 B1 9/2001 Nagatsuma et al.
6,289,464 B1 9/2001 Wecker et al.
6,292,687 B1 9/2001 Lowell et al.
6,298,306 B1 10/2001 Suarez et al.
6,300,875 B1 10/2001 Schafer
6,302,844 B1 10/2001 Walker et al.
6,304,467 B1 10/2001 Nebrigic
6,314,308 B1 11/2001 Sheynblat et al.
6,315,719 B1 11/2001 Rode et al.
6,317,049 B1 11/2001 Toubia et al.
6,321,091 B1 11/2001 Holland
6,321,158 B1 11/2001 DeLorme et al.
6,323,807 B1 11/2001 Golding et al.
6,324,213 B1 11/2001 Harrison
6,327,533 B1 12/2001 Chou
6,330,149 B1 12/2001 Burrell
6,331,817 B1 12/2001 Goldberg
6,331,825 B1 12/2001 Ladner et al.
6,339,397 B1 1/2002 Baker
6,340,928 B1 1/2002 McCurdy
6,342,847 B1 1/2002 Archuleta et al.
6,349,257 B1 2/2002 Liu et al.
6,353,390 B1 3/2002 Beri et al.
6,353,798 B1 3/2002 Green et al.
6,356,836 B1 3/2002 Adolph
6,356,841 B1 3/2002 Hamrick et al.
6,362,778 B2 3/2002 Neher
6,363,254 B1 3/2002 Jones et al.
6,363,323 B1 3/2002 Jones
6,366,871 B1 4/2002 Geva
6,373,430 B1 4/2002 Beason et al.
6,377,810 B1 4/2002 Geiger et al.
6,384,724 B1 5/2002 Landais
6,388,612 B1 5/2002 Neher
6,393,346 B1 5/2002 Keith et al.
6,404,352 B1 6/2002 Ichikawa et al.
6,407,698 B1 6/2002 Ayed
6,411,892 B1 6/2002 Van Diggelen
6,411,899 B2 6/2002 Dussell et al.
6,421,538 B1 7/2002 Byrne
6,426,719 B1 7/2002 Nagareda et al.
6,427,120 B1 7/2002 Garin et al.
6,430,602 B1 8/2002 Kay et al.
6,433,732 B1 8/2002 Dutta et al.
6,434,396 B1 8/2002 Rune
6,437,692 B1 8/2002 Petite et al.
6,441,778 B1 8/2002 Durst et al.
6,442,380 B1 8/2002 Mohindra
6,442,391 B1 8/2002 Johansson et al.
6,443,890 B1 9/2002 Schulze et al.
6,445,937 B1 9/2002 daSilva
6,453,237 B1 9/2002 Fuchs et al.
6,463,272 B1 10/2002 Wallace et al.
6,466,821 B1 10/2002 Pianca et al.
6,469,639 B2 10/2002 Tanenhaus et al.
6,478,736 B1 11/2002 Mault
6,484,034 B1 11/2002 Tsunehara et al.
6,496,775 B2 12/2002 McDonald, Jr. et al.
6,501,429 B2 12/2002 Nakamura et al.
6,505,048 B1 1/2003 Moles et al.
6,505,049 B1 1/2003 Dorenbosch
6,512,456 B1 1/2003 Taylor, Jr.
6,513,532 B2 2/2003 Mault et al.
6,522,871 B1 2/2003 Patrick et al.
6,522,889 B1 2/2003 Aarnio
6,529,164 B1 3/2003 Carter
6,529,822 B1 3/2003 Millington et al.
6,544,193 B2 4/2003 Abreu
6,552,652 B2 4/2003 Beken
6,553,310 B1 4/2003 Lopke
6,553,336 B1 4/2003 Johnson et al.
6,559,620 B2 5/2003 Zhou et al.
6,560,463 B1 5/2003 Santhoff
6,569,094 B2 5/2003 Suzuki et al.
6,571,193 B1 5/2003 Unuma et al.
6,579,231 B1 6/2003 Phipps
6,579,844 B1 6/2003 Morrison et al.
6,611,688 B1 8/2003 Raith
6,616,593 B1 9/2003 Elliott et al.
6,625,437 B1 9/2003 Jampolsky et al.
6,630,885 B2 10/2003 Hardman et al.
6,640,085 B1 10/2003 Chatzipetros et al.
6,650,907 B1 11/2003 Kamperschroer et al.
6,661,372 B1 12/2003 Girerd et al.
6,679,071 B1 1/2004 Storey et al.
6,696,982 B2 2/2004 Yoshioka et al.
6,697,103 B1 2/2004 Fernandez et al.
6,697,730 B2 2/2004 Dickerson
6,714,158 B1 3/2004 Underbrink et al.
6,714,791 B2 3/2004 Friedman
6,721,542 B1 4/2004 Anttila et al.
6,737,989 B2 5/2004 Flick
6,741,927 B2 5/2004 Jones
6,747,675 B1 6/2004 Abbott et al.
6,748,318 B1 6/2004 Jones
6,788,766 B2 9/2004 Logan
6,801,853 B2 10/2004 Workman
6,804,606 B2 10/2004 Jones
6,819,269 B2 11/2004 Flick
6,825,767 B2 11/2004 Humbard
6,832,093 B1 12/2004 Ranta
6,847,892 B2 1/2005 Zhou et al.
6,856,804 B1 2/2005 Ciotta
6,856,807 B1 2/2005 Raith
6,865,385 B1 3/2005 Kohda et al.
6,876,862 B1 4/2005 Tanaka
6,888,879 B1 5/2005 Lennen
6,937,900 B1 8/2005 Pianca et al.
6,952,645 B1 10/2005 Jones
6,975,941 B1 12/2005 Lau et al.
6,980,813 B2 12/2005 Mohi et al.
6,980,826 B2 12/2005 Yamaguchi
6,997,882 B1 2/2006 Parker et al.
7,003,273 B1 2/2006 Shimanuki et al.
7,010,144 B1 3/2006 Davis et al.
7,071,842 B1 7/2006 Brady, Jr.
7,085,253 B2 8/2006 Yang
7,110,773 B1 9/2006 Wallace et al.
7,136,832 B2 11/2006 Li et al.
7,187,278 B2 3/2007 Biffar
7,212,829 B1 5/2007 Lau et al.
7,218,938 B1 5/2007 Lau et al.
7,253,731 B2 8/2007 Joao
7,308,272 B1 12/2007 Wortham
7,321,774 B1 1/2008 Lau et al.
7,325,061 B2 1/2008 Haruki

(56) References Cited

U.S. PATENT DOCUMENTS 7,366,522 B2 4/2008 Thomas
7,375,682 B1 5/2008 Tester et al.
7,403,972 B1 7/2008 Lau et al.
7,482,920 B2 1/2009 Joao
7,539,557 B2 5/2009 Yamauchi
7,663,502 B2 2/2010 Breed
7,809,377 B1 10/2010 Lau et al.
7,905,832 B1 3/2011 Lau et al.
7,953,809 B2 5/2011 Lau et al.
8,131,326 B2 3/2012 Persico
8,176,135 B2 5/2012 Lau et al.
8,285,484 B1 10/2012 Lau et al.
8,301,158 B1 10/2012 Thomas
8,447,822 B2 5/2013 Lau et al.
8,611,920 B2 12/2013 Lau et al.
8,620,343 B1 12/2013 Lau et al.
8,700,050 B1 4/2014 Thomas
8,725,165 B2 5/2014 Lau et al.
8,753,273 B1 6/2014 Lau et al.
8,868,103 B2 10/2014 Thomas
8,886,220 B2 11/2014 Lau et al.
8,975,941 B2 3/2015 Zierhofer
9,049,571 B2 6/2015 Lau et al.
9,074,903 B1 7/2015 Lau et al.
9,082,103 B2 7/2015 Breed
9,182,238 B2 * 11/2015 Lau ........................ H04W 64/00
9,219,988 B2 12/2015 Lau et al.
9,456,350 B2 9/2016 Lau et al.
9,596,579 B2 3/2017 Lau et al.
9,706,374 B2 7/2017 Lau et al.
9,723,442 B2 8/2017 Lau et al.
9,759,817 B2 9/2017 Lau et al.
9,769,630 B2 9/2017 Lau et al.
9,930,503 B2 3/2018 Lau et al.
9,998,886 B2 6/2018 Lau et al.
10,034,150 B2 7/2018 Lau et al.
10,152,876 B2 12/2018 Joao
10,327,115 B2 6/2019 Lau et al.
10,356,568 B2 7/2019 Lau et al.
10,516,975 B2 12/2019 Lau et al.
10,609,516 B2 3/2020 Lau et al.
10,614,408 B2 4/2020 Lau et al.
10,628,783 B2 4/2020 Lau et al.
10,652,690 B2 5/2020 Lau et al.
10,664,789 B2 5/2020 Lau et al.
10,715,970 B2 7/2020 Lau et al.
10,761,214 B2 * 9/2020 Lau ........................ G06F 1/329
10,827,298 B2 11/2020 Lau et al.
10,848,932 B2 11/2020 Lau et al.
10,873,828 B2 12/2020 Lau et al.
11,032,677 B2 6/2021 Lau et al.
11,041,960 B2 6/2021 Lau et al.
11,054,527 B2 7/2021 Lau et al.
11,067,704 B2 7/2021 Lau et al.
2001/0006891 A1 7/2001 Cho
2001/0020202 A1 9/2001 Obradovich et al.
2001/0020204 A1 9/2001 Runyon et al.
2001/0022558 A1 9/2001 Karr, Jr. et al.
2001/0023448 A1 9/2001 Hanhan
2001/0026240 A1 10/2001 Neher
2001/0027378 A1 10/2001 Tennison et al.
2001/0027384 A1 10/2001 Schulze et al.
2001/0027525 A1 10/2001 Gamlin
2001/0028304 A1 10/2001 I'Anson et al.
2001/0041554 A1 11/2001 Rowell
2001/0044299 A1 11/2001 Sandegren
2001/0044332 A1 11/2001 Yamada et al.
2001/0047125 A1 11/2001 Quy
2001/0052849 A1 12/2001 Jones, Jr.
2001/0053699 A1 12/2001 McCrady et al.
2002/0000916 A1 1/2002 Richards
2002/0000930 A1 1/2002 Crowson et al.
2002/0008661 A1 1/2002 McCall et al.
2002/0015439 A1 2/2002 Kohli et al.
2002/0016173 A1 2/2002 Hunzinger
2002/0027507 A1 3/2002 Yarin et al.
2002/0028988 A1 3/2002 Suzuki et al.
2002/0036593 A1 3/2002 Ying
2002/0038182 A1 3/2002 Wong et al.
2002/0047649 A1 4/2002 Fregoso et al.
2002/0049742 A1 4/2002 Chan et al.
2002/0050945 A1 5/2002 Tsukishima et al.
2002/0052794 A1 * 5/2002 Bhadra ................ G06Q 20/203
705/22
2002/0055362 A1 5/2002 Aoyama
2002/0057192 A1 5/2002 Eagleson et al.
2002/0063622 A1 5/2002 Armstrong et al.
2002/0070862 A1 6/2002 Francis et al.
2002/0071677 A1 6/2002 Sumanaweera
2002/0077080 A1 6/2002 Greene
2002/0087260 A1 7/2002 Hancock et al.
2002/0087619 A1 7/2002 Tripathi
2002/0092448 A1 7/2002 Park
2002/0094067 A1 7/2002 August
2002/0099567 A1 7/2002 Joao
2002/0111171 A1 8/2002 Boesch et al.
2002/0111819 A1 8/2002 Li et al.
2002/0115450 A1 8/2002 Muramatsu
2002/0115453 A1 8/2002 Poulin et al.
2002/0116080 A1 8/2002 Birnbach et al.
2002/0119770 A1 8/2002 Twitchell et al.
2002/0119789 A1 8/2002 Friedman
2002/0120394 A1 8/2002 Rayne
2002/0120475 A1 8/2002 Morimoto
2002/0120503 A1 8/2002 Iwayama et al.
2002/0123353 A1 9/2002 Savoie
2002/0138196 A1 9/2002 Polidi et al.
2002/0140081 A1 10/2002 Chou et al.
2002/0173910 A1 11/2002 McCall et al.
2002/0177476 A1 * 11/2002 Chou .................... G01S 5/0027
455/574
2002/0191757 A1 12/2002 Belrose
2002/0193121 A1 12/2002 Nowak et al.
2002/0193996 A1 12/2002 Squibbs et al.
2002/0198003 A1 12/2002 Klapman
2002/0198055 A1 12/2002 Bull et al.
2003/0001775 A1 * 1/2003 Turner .................. G01S 5/0284
342/357.48
2003/0003943 A1 1/2003 Bajikar
2003/0009410 A1 1/2003 Ramankutty et al.
2003/0013445 A1 1/2003 Fujiwara et al.
2003/0018430 A1 1/2003 Ladetto et al.
2003/0036389 A1 2/2003 Yen
2003/0036683 A1 2/2003 Kehr et al.
2003/0054827 A1 3/2003 Schmidl et al.
2003/0068605 A1 4/2003 Kullok et al.
2003/0069759 A1 4/2003 Smith
2003/0083011 A1 5/2003 Haller et al.
2003/0083046 A1 5/2003 Mathis
2003/0083814 A1 5/2003 Gronemeyer
2003/0095540 A1 5/2003 Mulligan et al.
2003/0100326 A1 5/2003 Grube et al.
2003/0101225 A1 5/2003 Han et al.
2003/0107514 A1 6/2003 Syrjarinne et al.
2003/0110003 A1 6/2003 Topmiller
2003/0114206 A1 6/2003 Timothy et al.
2003/0151507 A1 8/2003 Andre et al.
2003/0163287 A1 8/2003 Vock et al.
2003/0182052 A1 9/2003 DeLorme
2003/0204132 A1 10/2003 Suzuki et al.
2004/0034470 A1 2/2004 Workman
2004/0046637 A1 3/2004 Wesby Van Swaay
2004/0114731 A1 6/2004 Gillett et al.
2004/0117108 A1 6/2004 Nemeth
2004/0172566 A1 9/2004 Greiger et al.
2004/0180701 A1 9/2004 Livet et al.
2004/0192352 A1 9/2004 Vallstrom et al.
2004/0203352 A1 10/2004 Hall
2004/0204820 A1 10/2004 Diaz
2004/0233065 A1 11/2004 Freeman
2005/0046584 A1 3/2005 Breed
2005/0068169 A1 3/2005 Copley et al.
2005/0250440 A1 11/2005 Zhou et al.
2005/0278063 A1 12/2005 Hersh et al.

(56) References Cited

U.S. PATENT DOCUMENTS

| | | | |
|---|---|---|---|
| 2006/0073851 | A1 | 4/2006 | Colando et al. |
| 2006/0129691 | A1 | 6/2006 | Coffee et al. |
| 2006/0139375 | A1 | 6/2006 | Rasmussen et al. |
| 2006/0173444 | A1 | 8/2006 | Choy et al. |
| 2006/0211430 | A1 | 9/2006 | Persico |
| 2007/0156286 | A1 | 7/2007 | Yamauchi |
| 2007/0242131 | A1 | 10/2007 | Sanz-Pastor et al. |
| 2008/0021645 | A1 | 1/2008 | Lau et al. |
| 2008/0261636 | A1 | 10/2008 | Lau et al. |
| 2009/0042540 | A1 | 2/2009 | Bodnar et al. |
| 2011/0022533 | A1 | 1/2011 | Lau et al. |
| 2011/0223884 | A1 | 9/2011 | Lau et al. |
| 2012/0220266 | A1 | 8/2012 | Lau et al. |
| 2013/0203388 | A1 | 8/2013 | Thomas et al. |
| 2013/0297524 | A1 | 11/2013 | Lau et al. |
| 2014/0011524 | A1 | 1/2014 | Lau et al. |
| 2014/0067708 | A1 | 3/2014 | Lau et al. |
| 2014/0273953 | A1 | 9/2014 | Lau et al. |
| 2014/0278084 | A1 | 9/2014 | Lau et al. |
| 2014/0296659 | A1 | 10/2014 | Lau et al. |
| 2015/0011243 | A1 | 1/2015 | Thomas et al. |
| 2015/0038168 | A1 | 2/2015 | Thomas et al. |
| 2015/0264576 | A1 | 9/2015 | Lau et al. |
| 2016/0025863 | A1 | 1/2016 | Lau et al. |
| 2016/0029175 | A1 | 1/2016 | Lau et al. |
| 2016/0050533 | A1 | 2/2016 | Lau et al. |
| 2017/0013426 | A1 | 1/2017 | Lau et al. |
| 2017/0094458 | A1 | 3/2017 | Thomas et al. |
| 2017/0111776 | A1 | 4/2017 | Lau et al. |
| 2017/0111777 | A1 | 4/2017 | Lau et al. |
| 2017/0188208 | A1 | 6/2017 | Lau et al. |
| 2017/0295462 | A1 | 10/2017 | Lau et al. |
| 2017/0353841 | A1 | 12/2017 | Lau et al. |
| 2018/0011201 | A1 | 1/2018 | Lau et al. |
| 2018/0027394 | A1 | 1/2018 | Lau et al. |
| 2018/0211216 | A1 | 7/2018 | Lau et al. |
| 2018/0213372 | A1 | 7/2018 | Lau et al. |
| 2018/0255439 | A1 | 9/2018 | Lau et al. |
| 2018/0302759 | A1 | 10/2018 | Lau et al. |
| 2019/0215643 | A1 | 7/2019 | Lau et al. |
| 2020/0064491 | A1 | 2/2020 | Lau et al. |
| 2020/0077236 | A1 | 3/2020 | Lau et al. |
| 2020/0226542 | A1 | 7/2020 | Lau et al. |
| 2020/0242551 | A1 | 7/2020 | Lau et al. |
| 2020/0304963 | A1 | 9/2020 | Lau et al. |
| 2020/0326429 | A1 | 10/2020 | Lau et al. |
| 2020/0355833 | A1 | 11/2020 | Lau et al. |
| 2021/0142272 | A1 | 5/2021 | Lau et al. |
| 2021/0160651 | A1 | 5/2021 | Lau et al. |
| 2021/0297816 | A1 | 9/2021 | Lau et al. |

FOREIGN PATENT DOCUMENTS

| | | | |
|---|---|---|---|
| EP | 1 037 447 | A3 | 10/2001 |
| JP | 09251069 | A | 9/1997 |
| JP | 11-64482 | | 3/1999 |
| JP | 11-258325 | | 9/1999 |
| JP | 11-289574 | | 10/1999 |
| JP | 11-306491 | | 11/1999 |
| JP | 2001344678 | A | 12/2001 |
| WO | WO 97/14054 | | 4/1997 |
| WO | WO 97/41654 | A1 | 11/1997 |
| WO | WO 98/01769 | A1 | 1/1998 |
| WO | WO 98/16045 | A1 | 4/1998 |
| WO | WO 98/40837 | | 9/1998 |
| WO | WO 00/51391 | | 8/2000 |
| WO | WO 01/50151 | A1 | 7/2001 |
| WO | WO 01/63318 | A1 | 8/2001 |
| WO | WO 01/75700 | A2 | 10/2001 |
| WO | WO 02/42979 | A1 | 5/2002 |
| WO | WO 02/084618 | A1 | 10/2002 |
| WO | WO 03/012720 | A1 | 2/2003 |

OTHER PUBLICATIONS

Notice of Allowance for U.S. Appl. No. 16/938,034, dated Jan. 26, 2021.
Office Action for U.S. Appl. No. 16/983,034, dated Jan. 7, 2021.
Danger Product Overview, Danger, Inc., date unknown, 5 pgs.
PCVtrak™ Installation and Operator's Manual, Trimble Navigation, 24623-00 Rev. A, May 1994, pp. 1-259.
"Advanced Traveler Aid Systems for Public Transportation," Final Report, Federal Transit Administration, Sep. 1994, pp. 1-131.
Campbell, Laurel, "SECURITY—Military satellite enlisted to thwart car crime," The Commercial Appeal, Sep. 26, 1996, pp. 5B.
Law, Alex, "Week in Wheels/ . . . From a Driver's Notebook," Newsday, Inc., Sep. 20, 1996, pp. C03.
Cortez, Angela, "Springs police can track thief, vehicles," The Denver Post, Sep. 10, 1996, pp. B-01.
"OnGuard Tracker Nabs Auto Burglar," Global Positioning & Navigation News, vol. 6, No. 16, Aug. 8, 1996.
"OnGuard Tracker Nabs Auto Burglar," Section: Financial News, PR Newswire, Jul. 29, 1996.
Nauman, Matt, "Pressing the Panic Button: Car Security Enters a New Age with Cellular Phones and Satellites that Watch Over You," San Jose Mercury News, Jun. 21, 1996, pp. 1G.
"Monday Briefing" San Antonio Express-News, p. 1, Part B, Jun. 10, 1996.
"OnGuard Tracker Makes Debut on 'One Lap of America'," PR Newswire, Jun. 7, 1996.
"OnGuard Tracker Makes Debut on 'One Lap of America'," Southwest Newswire, Jun. 7, 1996.
Dominguez, Raul, "Women get their day in sun—American Golf planning events nationwide May 18," San Antonio Express-News, Apr. 18, 1996, pp. 2, part B.
"Vehicle Navigation Units Being Measured in Luxury Autos," Global Positioning & Navigation News, vol. 6, No. 7, Apr. 4, 1996.
"Advanced Business Sciences, Inc. Announces Completion of Acquisition of Comguard of Illinois," Business Wire, Aug. 26, 1998.
"Advanced Business Sciences, Inc. Announces Filing With Securities and Exchange Commission," Business Wire, Jun. 25, 1999.
"Advanced Business Sciences, Inc. Announces Preliminary Fourth Quarter 1998 Revenue Results," Business Wire, Feb. 4, 1999.
"Business People Burnsy's Grill Names Two," Omaha World-Herald, Section Business, p. 4M, Oct. 20, 1996.
"Company Sees Prisoner Tracking and Monitoring Market Niche," Global Positioning & Navigation News, vol. 6, No. 10, May 16, 1996.
GPS-Based Personal Monitoring Systems Offered to Corrections, Private Market, Global Positioning & Navigation News, vol. 8, No. 11, Jun. 3, 1998.
GPS tracks parolees, probationers, Corrections Professional, vol. 5, No. 6, Nov. 19, 1999.
High-Tech System Tracks Offenders—Satellites Watching Criminals, Business Wire, Nov. 14, 1997.
Briefs, Global Positioning & Navigation News, vol. 9, No. 4, Feb. 24, 1999.
Dunkelberger, Lloyd, "Lawmakers question criminal-tracking system," Sarasota Herald-Tribune (Florida), pp. 16A, Nov. 28, 1999.
Powell, Barbara. "New gadgets help drivers find their way," Fort Worth Star-Telegram (Texas), p. 1, Jan. 20, 1997.
"New Service Lets Corrections Agencies Track Offenders by Satellite," PR Newswire, Jan. 11, 1999.
"New Service Lets Corrections Agencies Track Offenders by Satellite; SecutityLink Offers "GPS" Tracking for Offenders on Electronic Monitoring—Sandusky Municipal Court Adopts Technology for Local Offenders," PR Newswire, Jan. 12, 1999.
"New Service Lets Corrections Agencies Track Offenders by Satellite; SecurityLink Offers 'GPS' Tracking for Offenders on Electronic Monitoring," PR Newswire, Section: Financial News, Jan. 11, 1999.
"New Service Lets Corrections Agencies Track Offenders by Satellite," Satellite Today, vol. 2, No. 8, Jan. 13, 1999.
"Prisoner Security Monitoring Company Grabs Contracts for GPS-Based System," Global Positioning & Navigation News, vol. 7, No. 1, Jan. 15, 1997.

(56) References Cited

OTHER PUBLICATIONS

Atwater, Andi, "Proposal seeking 24-hour tracking of all sex offenders," The News-Press (Fort Meyers, FL), pp. 1A, Feb. 20, 2000.
Briefs, Global Positioning & Navigation News, vol. 9, No. 3, Feb. 10, 1999.
Brauer, David, "Satellite 'Big Brother' Tracks Ex-Inmates; Agencies Experiment with GPS to Monitor Parolee Whereabouts," Chicago Tribune, Section: News, p. 31, Dec. 18, 1998.
"Satellite Spotlight; Eye in the Sky to Monitor Parolees," Satellite News, vol. 21, No. 15, Apr. 13, 1998.
"Satellite Spotlight: Fighting Crime From Space," Satellite News, vol. 19, No. 20, May 13, 1996.
Prohaska, Thomas J, "Satellite Will Keep Tabs on Convicts," Buffalo News (New York), Section: Local, p. 5B, Sep. 20, 1999.
"Sierra Wireless and Pro Tech Team Up on Monitoring Product," Global Positioning & Navigation News, vol. 8, No. 8, Apr. 22, 1998.
Anderson, Larry, "Technology rules at Securing New Ground," Access Control & Security Systems Integration, Section: Industry Outlook; ISSN 1084-6425, Dec. 1999.
Trimble Navigation Warns 2nd-Quarter Earnings to Miss Target, Dow Jones Business News, Jul. 10, 1998.
"Trimble Navigation's Net Income Skidded 93% Amid Order Delays," Dow Jones Business News, Jul. 23, 1998.
Briefs, Global Positioning & Navigation News, vol. 9, No. 2, Jan. 27, 1999.
Briefs, Global Positioning & Navigation News, vol. 9, No. 14, Jul. 14, 1999.
Dailey et al. "Automatic Transit Location System," Final Research Report, 55 pgs., Feb. 1996.
Maguire, Jr. et al. "SmartBadges: a wearable computer and communication system," codes/CASHE '98, 47 pgs., 1998.
Koshima et al. "Personal locator services emerge," IEEE Spectrum, Feb. 2000, pp. 41-48.
Zygowicz et al. "State of the Art in Automatic Vehicle Location Systems," Center for Urban Transportation Studies, University of Wisconsin, Milwaukee, Feb. 1998.
Ashworth, Jon. "Big brother is watching you," The Times (London), Section: Features, May 7, 1999.
"Car Thieves Take the "Bait" in Michigan; Two Suspects Reeled in With OnGuard," Business Wire, Sep. 11, 1997.
Sauer, Matthew, "Company Finds Niche by Giving Directions . . . " Sarasota Herald-Tribune (Florida), Section: Business Weekly, p. 1, Jul. 7, 1997.
"ATX Technologies Signs Nationwide Service Deal with AT&T," Global Positioning & Navigation News, vol. 7, No. 9, May 7, 1997.
"Car Thieves Take the 'Bait' in Tulsa; Two Suspects Caught Off Guard with OnGuard Once Again," PR Newswire, Section: Financial News, Jan. 8, 1997.
"Car Thieves Take the 'Bait' in Tulsa; Two Suspects Caught Off Guard with on Guard," PR Newswire, Section: Financial News, Dec. 9, 1996.
Jackson, Terry, "Smart Cars Whether by Satellite or the Internet, High-Tech Devices and Services May Make Crumpled Road Maps a Thing of the Past," The Miami Herald, Section: Travel, p. 1J, Oct. 6, 1996.
"San Antonio Personal Security Company Links Up with Senior PGA Golfer," PR Newswire, Section: Financial News, Apr. 1, 1996.
"San Antonio Personal Security Company Links Up with Senior PGA Golfer," Southwest Newswire, Apr. 1, 1996.
Business Briefs, San Antonio Express-News, Mar. 25, 1996.
"ATX Research Signs Exclusive Sales Agreement with Arizona Company," PR Newswire, Mar. 21, 1996.
"ATX Research Signs Exclusive Sales Agreement with Arizona Company," Southwest Newswire, Mar. 21, 1996.
"Automotive GPS Satellite/Safety System Race Is on," Southwest Newswire, Feb. 20, 1996.
"Dealerships Can Track Down New Aftermarket Revenues," PR Newswire, Feb. 9, 1996.
"ATX Research Unveils New Stealthtrac Capability," PR Newswire, Feb. 9, 1996.
"Dealerships Can Track Down New Aftermarket Revenues," Southwest Newswire, Feb. 9, 1996.
Briefs, Global Positioning & Navigation News Wire, vol. 6, No. 2, Jan. 24, 1996.
"ATX Research Provides Police Departments With Onguard Personal Security and Vehicle Tracking System," PR Newswire, Jan. 15, 1996.
"ATX Research Provides Police Departments With Onguard Personal Security and Vehicle Tracking System," Southwest Newswire, Jan. 15, 1996.
"ATX Research Relocates to New Corporate Headquarters," PR Newswire, Dec. 12, 1995.
"ATX Research Relocates to New Corporate Headquarters," Southwest Newswire, Dec. 12, 1995.
"Texas invention tracks stolen cars, lets driver call for help," The Vancouver Sun, Oct. 20, 1995.
"San Antonio Company Unveils Satellite/Cellular Personal Security System," PR Newswire, Oct. 3, 1995.
"San Antonio Company Unveils Satellite/Cellular Personal Security System," Southwest Newswire, Oct. 3, 1995.
Notice of Allowance for U.S. Appl. No. 16/896,357, dated Feb. 17, 2021.
Office Action for U.S. Appl. No. 10/397,473, dated Nov. 25, 2003.
Office Action for U.S. Appl. No. 10/397,473, dated Jun. 8, 2004.
Office Action for U.S. Appl. No. 10/397,473, dated Nov. 17, 2004.
Notice of Allowance for U.S. Appl. No. 10/397,473, dated Mar. 29, 2005.
Notice of Allowance for U.S. Appl. No. 10/397,473, dated Jun. 9, 2005.
Notice of Allowance for U.S. Appl. No. 10/397,473, dated Nov. 3, 2005.
Notice of Allowance for U.S. Appl. No. 11/124,475, dated Jun. 22, 2012.
Notice of Allowance for U.S. Appl. No. 11/124,475, dated Mar. 30, 2012.
Non-Final Office Action for U.S. Appl. No. 11/124,475, dated Dec. 5, 2011.
Non-Final Office Action for U.S. Appl. No. 11/124,475, dated Jun. 30, 2011.
Advisory Action for U.S. Appl. No. 11/124,475, dated Apr. 19, 2011.
Office Action for U.S. Appl. No. 11/124,475, dated Jan. 12, 2011.
Office Action for U.S. Appl. No. 11/124,475, dated Jul. 7, 2010.
Advisory Action for U.S. Appl. No. 11/124,475, dated Mar. 5, 2010.
Office Action for U.S. Appl. No. 11/124,475, dated Aug. 11, 2009.
Office Action for U.S. Appl. No. 11/124,475, dated Dec. 18, 2009.
Office Action for U.S. Appl. No. 11/124,475, dated Jun. 30, 2008.
Office Action for U.S. Appl. No. 11/124,475, dated Dec. 31, 2008.
Advisory Action for U.S. Appl. No. 11/124,475, dated Mar. 13, 2008.
Office Action for U.S. Appl. No. 11/124,475, dated Dec. 18, 2007.
Office Action for U.S. Appl. No. 11/124,475, dated Jul. 12, 2007.
Office Action for U.S. Appl. No. 11/124,475, dated Jan. 19, 2007.
Restriction Requirement for U.S. Appl. No. 11/124,475, dated Jul. 6, 2006.
Office Action for U.S. Appl. No. 11/124,475, dated Jan. 31, 2006.
Office Action for U.S. Appl. No. 12/381,776, dated Jul. 20, 2011.
Restriction Requirement for U.S. Appl. No. 12/381,776, dated Feb. 19, 2010.
Office Action for U.S. Appl. No. 12/381,776, dated Dec. 6, 2010.
Office Action for U.S. Appl. No. 12/381,776, dated Jan. 3, 2012.
Office Action for U.S. Appl. No. 12/381,776, dated Aug. 29, 2012.
Office Action for U.S. Appl. No. 12/381,776, dated Jan. 17, 2013.
Office Action for U.S. Appl. No. 12/381,776, dated Jun. 5, 2013.
Advisory Action for U.S. Appl. No. 12/831,776, dated Oct. 8, 2014.
Advisory Action for U.S. Appl. No. 12/831,776, dated Oct. 28, 2014.
Office Action for U.S. Appl. No. 12/381,776, dated Dec. 3, 2013.
Office Action for U.S. Appl. No. 12/381,776, dated Jul. 29, 2014.
Notice of Allowance for U.S. Appl. No. 12/381,776, dated Dec. 9, 2014.

(56) References Cited

OTHER PUBLICATIONS

Notice of Allowance for U.S. Appl. No. 12/381,776, dated Apr. 28, 2015.
U.S. Appl. No. 13/802,574, filed Mar. 13, 2013.
Office Action for U.S. Appl. No. 13/802,574, dated Jun. 4, 2014.
Office Action for U.S. Appl. No. 13/802,574, dated Oct. 31, 2014.
Office Action for U.S. Appl. No. 13/802,574, dated Mar. 24, 2015.
Notice of Allowance for U.S. Appl. No. 13/802,574, dated Jun. 23, 2015.
Office Action for U.S. Appl. No. 14/875,844, dated Jun. 27, 2016.
Office Action for U.S. Appl. No. 14/875,844, dated Jan. 3, 2017.
Notice of Allowance for U.S. Appl. No. 14/875,844, dated Apr. 3, 2017.
Notice of Allowance for U.S. Appl. No. 14/875,844, dated Jul. 17, 2017.
Office Action for U.S. Appl. No. 15/700,498, dated Jul. 17, 2018.
Office Action for U.S. Appl. No. 15/700,498, dated Jan. 4, 2019.
Office Action for U.S. Appl. No. 15/700,498, dated Jul. 18, 2019.
Notice of Allowance for U.S. Appl. No. 15/700,498, dated Nov. 1, 2019.
Office Action for U.S. Appl. No. 15/700,498, dated Mar. 24, 2020.
Office Action for U.S. Appl. No. 16/658,258, dated Jun. 30, 2020.
Notice of Allowance for U.S. Appl. No. 16/658,258, dated Aug. 3, 2020.
Office Action for U.S. Appl. No. 16/658,258, dated Nov. 13, 2020.
Office Action for U.S. Appl. No. 16/896,357, dated Nov. 16, 2020.
Office Action for U.S. Appl. No. 16/983,034, dated Sep. 24, 2020.
Notice of Allowance for U.S. Appl. No. 16/983,034, dated Nov. 20, 2020.
U.S. Appl. No. 12/150,203, filed Apr. 26, 2008.
U.S. Appl. No. 12/150,126, filed Apr. 26, 2008.
"352C22 Miniature Low Profile ICP Accelerometer," Precision Accelerometers, PCB Piezoelectronics Products—SVS Division, webpages, pp. 1-2 (downloaded Apr. 11, 2002: www.pcb.com/products/svs/svs352c22.html).
"3G Mobile Internet Revolution, . . . only with Location Based Services!" pp. 1, (downloaded Aug. 10, 2002: http://webhome.idirect.com/~dental/3glocator/home.htm).
"Airline Cargo Containers," Case Study, RJI Incorporated, webpages, pp. 1-2 (downloaded Mar. 16, 2002: www.rji.cc/casestudies/airlinecargocontainers.html).
"Airline Food Carts," Case Study, RJI Incorporated, webpages, pp. 1-2 (downloaded Mar. 16, 2002: www.rji.cc/casestudies/airlinefoodcarts.html).
"An Introduction to SnapTrack Server-Aided GPS Technology," SnapTrack Inc., Apr. 3, 2007.
Archived copy of a page entitled "Money-Back Guarantee Policy" from fedex.com, archived by the Internet Archive on Aug. 17, 2000.
"Audiovox Intros GPS, Bluetooth Phone;" INT Media Group, Inc. (allNetDevices), Apr. 5, 2002. (downloaded: www.allnetdevices.com/wireless/news/2001/1/15/audiovox_intros.html).
Bahl et al. "RADAR: An In-Building RF-based User Location and Tracking System," *Proc. of the IEEE Conf. on Comp. Comm., INFOCOM2000, 19th Annual Joint Conf. of the IEEE Computer and Communications Societies*, Mar. 2000, 10 pgs.
Benefon Esc! Owner's Manual, Publication No. YZ2400-4*, © Benefon Oyj, 2002, pp. 169.
"Carrier and end-user applications for wireless location systems," TruePosition, Inc., http://www.trueposition.com/spie_app.htm, downloaded, Jul. 30, 2000, pp. 1-7.
Capozza, P.T., et al. "A single-chip narrow-band frequency domain excisor for a Global Positioning System (GPS) receiver," IEEE Journal of Solid-State Circuits, vol. 35, Issue 3, Mar. 2000, pp. 401-411.
"Danger—Products" and "Hiptop Communicator Brochure," Danger, Inc., downloaded Oct. 26, 2002: www.danger.com/products.php).
"Developing a GPSs for the Global Supply Chain," Aberdeen Group, Inc., Executive White Paper, Jun. 2002.
"Devices for Text Messages in Deutsche Telekom's fixed network have already found their way into many households," Deutsche Telekom AG, Press Release, Mar. 13, 2002, pp. 1-2.
"Digital/Analog Compass Sensors" and "1655 Digital Compass Sensor," webpages, The Robson Company, Inc., pp. 1-2 (downloaded Apr. 11, 2002: www.dinsmoresensors.com/index.html).
"EarthTrack™ Vehicle Tracking Systems," Outfitter Satellite, Inc., 1998 (downloaded Jan. 22, 2000).
"Enhanced Tracking," United Parcel Service of America, Inc. (UPS), webpages, pp. 1-2 (downloaded Jun. 1, 2002: www.ups.com/myupsinfo/info/etrack?pnav=stdservice).
"Fleet Management Systems—Asset Tracking Devices," Axiom Navigation Inc., 2000-2001 (downloaded Oct. 19, 2002: www.axiomnav.com/Prod_Systems/prod_system.asp).
"Frozen Food Warehouse," Case Study, RJI Incorporated, webpages, pp. 1-3 (downloaded Mar. 16, 2002: www.rji.cc/casestudies/frozenfoodwarehouse.html).
"FunMail Launches on the NTT DoCoMo i-mode network," FunMail, Press Release, May 1, 2001, pp. 1-2.
Garmin, eTrex® Venture personal navigator™: Owner's Manual and Reference Guide, © 2001 Garmin, pp. 1-68.
"Global Cell Phone Location," Axiom Navigation Inc., 2000-2001 (downloaded Oct. 19, 2002: www.axiomnav.com/Prod_Global/prod_global.asp).
"Global Locating Services," SkyBitz, webpage, p. 1, (downloaded Nov. 15, 2002: www.skybitz.com/services/gls.html).
"GLS Communicator," SkyBitz, webpages, pp. 1-2, (downloaded Nov. 15, 2002: www.skybitz.com/gls/communicator.html).
"Guide to Tracking Info.," Nippon Express, website p., p. 1 (downloaded Jun. 9, 2002: www.nittsu.co.jp/edoc/howtoe.htm).
Heinrichs et al. "Synergies in Handset Architecture," *GPS World*, Mar 2002, vol. 13, Issue 3, p. 30-39.
Hightower et al. "Location Systems for Ubiquitous Computing," *Computer*, Aug. 2001, vol. 34, Issue 8, p. 57-66.
"Introduction to SMS," by C. Tull of Anywhere YouGo.com, pp. 1-4 (downloaded:www.devx.com/wireless/articles/SMS/SMSintro-asp), Aug. 10, 2002.
"IO Data Develops GPS Adapter for I-Mode Mobile," AsiaBizTech, Sep. 17, 2002, pp. 1-2.
LaMance et al. "Assisted GPS," *GPS World*, Mar. 2002, vol. 13, Issue 3, p. 46-51.
"Locate Networks: Our Service," Locate Networks, webpages, pp. 1-7 (downloaded Sep. 26, 2002: www.locatenetworks.com/).
"MMS phones: Don't believe the hype," CNN.com/SCI-TECH, Aug. 8, 2002, pp. 1-3.
"Mobile Location Based Services: Cell Tracking Devices of People & Thongs . . . ," pp. 1-2, (downloaded Aug. 10, 2002: http://3glocate.com).
"MoniTrack," Case Study, RJI Incorporated, webpages, pp. 1-2 (downloaded Mar. 16, 2002: www.rji.cc/technology/telematic.html).
"My ups.com Benefits," United Parcel Service of America, Inc. (UPS), webpage, p. 1 (downloaded Apr. 13, 2002: www.ups.com/myupsinfo/info/benefits?pnav=stdsservice).
"NavMate® Navigation System," Visteon Corporation, webpage, pp. 1-2 (downloaded Jun. 21, 2002: www.visteon.com/technology/automotive/navmate.html).
"News," SkyBitz, webpages, pp. 1-8, (downloaded Nov. 15, 2002: www.skybitz.com/about/news.html).
"Pakhound: Your Watchdog in the Shipping Industry," website pages, pp. 1-3 (downloaded Jun. 9, 2002: www.pakhound.com/fact.asp).
Palenchar, J. "E911 Update: What Major Carriers Have Planned," *TWICE: This Week in Consumer Electronics*, Oct. 8, 2001, vol. 16, Issue 23, p. 36.
"Parkwatch and Wherenet Unveil the First Amusement Visitor Locating system," ParkWatch, Press Release, Jun. 27, 2000.
"pulver.com's Location Based Services Report," pulver.com, Inc., Oct. 2001, pp. 1-17 (downloaded Jun. 4, 2002: www.pulver.com/lbsreport/lastbsreport.02/oct01.txt).
"Radio Frequency Identification (RFID)," Case Study, RJI Incorporated, webpage, p. 1 (downloaded Mar. 16, 2002: www.rji.cc/technology/rfid.html).

(56) References Cited

OTHER PUBLICATIONS

"Real Time Location System (RTLS)," Case Study, RJI Incorporated, webpage, p. 1 (downloaded Mar. 16, 2002: www.rji.cc/technology/rtls.html).
"Real-Time Warehouse Tracking," Case Study, RJI Incorporated, webpages, pp. 1-2 (downloaded Mar. 16, 2002: www.rji.cc/casestudies/rtwarehousetracking.html).
"Savi Reusable Transport Container," Savi Technology, Inc., Apr. 30, 2002, pp. 1-2.
"Send images to i-mode phones," Mobile Media Japan, 2001, pp. 1-3.
"Ski Rental with Auto ID and Tracking," Case Study, RJI Incorporated, webpages, pp. 1-2 (downloaded Mar. 16, 2002: www.rji.cc/casestudies/skirentalcompany.html).
"SnapTrack and SignalSoft Corp. Team Up to Trial Location-based Information Service for GSM Test Group," Press Release, SnapTrack Inc., Dec. 6, 1999.
"SnapTrack Awarded Additional Key Patents for Enhanced GPS System," Press Release, SnapTrack Inc., Jan. 4, 2000.
"Start-up crams single chip with phone, GPS and Bluetooth," CNET Network, Inc. (ZDNET), Mar. 22, 2002 (downloaded: http://news.zdnet.co.uk/story/0,t284-x2107163,00.html).
"Status Icons/Messages," Yahoo! Messenger Help, Yahoo! Inc., 2002, pp. 1-2.
Syrjarinne, J. "Keeping Time with Mobiles," *GPS World*, Jan. 2001, vol. 12, Issue 1, p. 22, 7pgs.
"Technical Applications of Our Current Technology," Aetherwire, webpages, pp. 1-4 (downloaded Mar. 16, 2002: www.aetherwire.com/CDROM/General/appl1.html).
"The Always on Network," Position Paper, Nortel Networks, 2002.
"Theme Park Visitors & Cashless Purchasing," Case Study, RJI Incorporated, webpages, pp. 1-2 (downloaded Mar. 16, 2002: www.rji.cc/casestudies/themepark.html).
"Track Shipments—Detailed Results," FedEx, webpages, pp. 1-2 (downloaded Oct. 29, 2002: www.fedex.com).
"Track Your FedEx Shipments via Email," FedEx, webpages, pp. 1-2 (downloaded Oct. 29, 2002: www.fedex.com).
"Tracking Helpful Tips," United Parcel Service of America, Inc. (UPS), webpages, pp. 1-2 (downloaded Jun. 1, 2002: www.ups.com/tracking/nm_help.html).
"Trimble and Rosum Team to Develop Universal Positioning Technology," Trimble Navigation, Inc., News Release, Feb. 27, 2003.
"Turning Position Into Knowledge," SkyBitz, webpage, p. 1, (downloaded Nov. 15, 2002: www.skybitz.com).
"UPS Package Tracking," United Parcel Service of America, Inc. (UPS), webpages, pp. 1-2 (downloaded Apr. 13, 2002: www.ups.com/tracking/tracking.html).
"UPS Wireless Solutions," United Parcel Service of America, Inc. (UPS), webpage, p. 1 (downloaded Apr. 13, 2002: www.ups.com/myupsinfo/info/wireless?pnav=stdsservice).
Van Diggelen et al. "Indoor GPS," *GPS World*, Sep. 2001, vol. 12, Issue 9, p. 50. 5pgs.
"Welcome to Iship, Inc.," iShip, Inc., webpages, pp. 1-2, (downloaded Jun. 9, 2002: www.iship.com/).
"Welcome to Traker Systems," Tracker Systems, webpages, pp. 1-2 (downloaded Jun. 9, 2002: www.trakersystems.com).
"What are Instant Messages?" Yahoo! Messenger Help, Yahoo! Inc., 2002, pp. 1.
"What is "3G" technology'?," CNN.com/SCI-TECH, Oct. 22, 2001, pp. 1-3.
"What is a Friend List?" Yahoo! Messenger Help, Yahoo! Inc., 2002, pp. 1.
"Wherify Wireless and SiRF Team to Deliver Child Locator System," Wherify Wireless, Inc., Press Release, Mar. 19, 2001, pp. 1-2.
"Wherify Wireless Breakthrough in Location-Based Services," Mobilemag.com, Feb. 28, 2001, p. 1.
"Wherify Wireless GPS Locator for Kids User Guide," Wherify Wireless, Inc., 2003, pp. 1-106.
"Wherify Wireless Location Services," Wherify Wireless, Inc., webpages, pp. 1-5 (downloaded: Mar. 25, 2003: www.wherifywireless.com/prod_watches.htm).
"X-GPS™—Hybrid GPS Location Server Solution," Axiom Navigation Inc., 2000-2001 (downloaded Oct. 19, 2002: www.axiomnav.com/Prod_Global/x-gps.asp).
"Yahoo! Messenger—Sending Messages to a Mobile Phone," Yahoo! Messenger, Yahoo! Inc., 2002, pp. 1-7 (downloaded Oct. 27, 2002: http://messenger.yahoo.com/messenger/wireless/pc2sms/tour1.html(through /tour7.html)).
"Yahoo! Messenger for Text Messaging," Yahoo! Messenger, Yahoo! Inc., 2002, pp. 1-10 (downloaded Oct. 27, 2002: http://messenger.yahoo.com/messenger/wireless/smsmsgr/tour1.html (through /tour7.html)).
"Yahoo! Messenger for WAP," Yahoo Messenger, Yahoo! Inc., 2002 (tours 1-9), pp. 1-17 (downloaded Oct. 27, 2002: www.messenger.yahoo.com/messenger/wireless/wap/tour1.html(through /tour9.html)).
Accelerometers—General Purpose, LP Series, Crossbow Technology, Inc., data sheet, pp. 1-3 (downloaded Apr. 11, 2002: www.xbow.com/Products/Accelerometers.htm).
Bickers, "Eyes in the sky," SafeTzone Technology Corporation, webpages, 2001, pp. 1-3 (downloaded: www.safetzone.com/newsKiosk.asp).
Chertkoff, Rachel, "Vehicle Locator Systems," Pager Technology, pp. 1-2, 1998.
Commercial Uses for LoJack (webpage), LoJack Corporation, downloaded Jan. 22, 2000.
Crossbow Product Guide—Accelerometers, Crossbow Technology, Inc., webpages, pp. 1-3 (downloaded Apr. 11, 2002: www.xbow.com/Products/Accelerometers.htm).
Culler, D. et al., "MICA: The Commercialization of Microsensor Motes," Sensors (Apr. 1, 2002), pp. 1-5.
Darabi et al., "A 2.4-GHz CMOS Transceiver for Bluetooth," IEEE Journal of Solid-State Circuits, vol. 36, No. 12 (Dec. 2001), pp. 2016-2024.
Delphi and MobileAria Demonstrate True Hands Free In-Vehicle Mobile Productivity Services at CES, Press Release, Delphi Automotive Systems, Jan. 8, 2002 (downloaded Apr. 5, 2002: www.delphiauto.com/news/pressRelease/pr6828-01082002).
F. Rivera, "Special Report: Keeping Tabs on Your Teen," 7 News, Boston, Apr. 30, 2002, pp. 1-3.
FedEx Insight, FedEx, webpages, pp. 1-11 (downloaded Oct. 29, 2002: www.fedex.com).
Fraden, J., Handbook of Modern Sensors: Physics, Designs and Applications, Second Edition, Springer-Verlag (1996), cover, pp. 310-354, 384-431, 458-493, and 513-528.
GPS2000, Omega Research and Development, Inc., webpages, pp. 1-9 (pp. 7-9 pertain to an online tour) (downloaded Jul., 14, 2003: www.gps2000online.com/).
Grimes, et al., "Wireless Magnetoelastic Resonance Sensors: A Critical Review," Sensors, vol. 2 (Jul. 23, 2002), pp. 294-313.
Helfenstein et al., Circuits and Systems for Wireless Communications, Kluwer Academic Publishers (2000), cover pages, pp. 3-7, 9-34, and 37-47.
Hill et al., "System Architecture Directions for Networked Sensors," ACM/ASPLOS-IX (Nov. 2000), 12 pages.
IMVironment, Yahoo! Messenger Yahoo! Inc., 2002, pp. 1-12 (downloaded (including) Oct. 27, 2002: http://help.yahoo.com/help/us/mesg/imv/imv-01.html(through /index5.html).
J.Wrolstad, "Chrysler Claims First With Bluetooth Mobile Phone System," Wireless Newsfactor, Oct. 26, 2001.
K. Hill, "Prada Uses Smart Tags to Personalize Shopping," CRMDaily.com, Apr. 24, 2002., pp. 1-4.
Madou, Marc J., Fundamentals of Microfabrication: the Science of Miniaturization, Second Edition, CRC Press (2002) 139 pages.
K. Miyake, "Sharp to unveil 3G PDA-type cell phone," ITworld.com, Inc., Jan. 11, 2002.
Kleinknecht, William, "Juvenile authorities want satellite tracking for felons," The Star-Ledger of New Jersey, Nov. 18, 1997.
LoadTrak, pp. 1-2 (downloaded Jun. 4, 2002: www.load-trak.com).
Mainwaring et al., "Wireless Sensor Networks for Habitat Monitoring," ACM (Sep. 28, 2002) pp. 88-97.

(56) References Cited

OTHER PUBLICATIONS

Marek, "The Unstoppable SnapTrack," Wireless Week, Dec. 18, 2000.
Motorola Consumer Catalog: Pagers (webpage), Motorola, Inc., downloaded Jan. 19, 2000.
My.Roadway!, Roadway Express, Inc., webpages, pp. 1-2, (downloaded Jun. 9, 2002: www.quiktrak.roadway.com/cgi-bin/quiktrak).
Package, Dictionary.com, http://dictionary.reference.com/browse/package (last accessed Nov. 6, 2013), 3 pgs.
Packtrack™, PackTrack.com, webpages, pp. 1-2 (downloaded Jun. 9, 2002: www.packtrack.com).
Precision Accelerometers, PCB Piezoelectronics Products—SVS Division, webpages, pp. 1-2 (downloaded Apr. 11, 2002: www.pcb.com/products/svs/index.html).
Rabinowitz and Spilker, Jr., "A New Positioning System Using Television Synchronization Signals," Rosum Corporation, pp. 1-11 (downloaded May 21, 2003).
Rabinowitz and Spilker, Jr., "Positioning Using the ATSC Digital Television Signal," Rosum Corporation Whitepaper, Rosum Corporation (downloaded May 21, 2003).
Razavi, Behzad, RF Microelectronics, Prentice Hall (1998), cover pages, pp. 1-10, and 118-297.
Real Time Locating System, Executive Summary, Technology Systems International, Inc., 2007.
Rofougaran et al., "A Single-Chip 900-MHz Spread-Spectrum Wireless Transceiver in 1-μm CMOS—Part II: Receiver Design," IEEE Journal of Solid-State Circuits, vol. 33, No. 4 (Apr. 1998), pp. 535-547.
Ryan, "Catching up with Dick Tracy," San Francisco Chronicle, news article, Mar. 18, 2002.
SandPiper GPS Receiver, Specification sheet by Axiom Navigation Inc. (www.axiomnav.com) 2006.
Senturia, Stephen D., Microsystem Design, Kluwer Academic Publishers (2001), cover pages, and pp. 3-14.
SiRF Debuts Revolutionary Architecture and Technologies to Further Drive GPS into the Mainstream, SiRF.com, Aug. 16, 1999 (archived Dec. 22, 1999), http://web.archive.org/web/19991222194810/http:/www.sirf.com/as_prss2_3.htm, 4 pgs.
Smart Antenna, Specification sheet by Axiom Navigation Inc. (www.axiomnav.com) 2008.
SnapTrack—Privacy Protection (webpage), SnapTrack Inc., downloaded Jan. 19, 2000.
SnapTrack—Technology at Work (webpage), SnapTrack Inc., downloaded Jan. 19, 2000.
SnapTrack in Action (webpage), SnapTrack Inc., downloaded Jan. 19, 2000.
Steyaert et al., "A 2-V Cmos Cellular Transceiver Front-End," IEEE Journal of Solid-State Circuits, vol. 35, No. 12, Dec. 2000, pp. 1895-1907.
Stilp, Louis A., "Examining the Coming Revolution in Location Services," pp. 1-11.
Strom, Stephanie. "A Wild Sleigh Ride at Federal Express," The New York Times, Dec. 20, 1994.
Swift A2 GPS Receiver, Specification sheet by Axiom Navigation Inc. (www.axiomnav.com) 2010.
Swift B2 GPS Receiver, Specification sheet by Axiom Navigation Inc. (www.axiomnav.com) 2010.
TruePosition Virtual Brochure (webpage), TruePosition, Inc.
Wong, "Fishers, golfers join the rush to GPS," San Jose Mercury News, news article, Mar. 25, 2002.
Office Action for U.S. Appl. No. 16/896,357, dated May 4, 2021.
Notice of Allowance for U.S. Appl. No. 16/896,357, dated May 27, 2021.

* cited by examiner

METHOD AND APPARATUS FOR INTELLIGENT ACQUISITION OF POSITION INFORMATION

CROSS REFERENCE TO RELATED APPLICATIONS

This application is a continuation of U.S. patent application Ser. No. 16/658,258, filed Oct. 21, 2019, and entitled, "METHOD AND APPARATUS FOR INTELLIGENT ACQUISITION OF POSITION INFORMATION," which is hereby incorporated herein by reference in its entirety, which is a continuation of U.S. patent application Ser. No. 15/700,498, now U.S. Pat. No. 10,761,214, filed Sep. 11, 2017, and entitled, "METHOD AND APPARATUS FOR INTELLIGENT ACQUISITION OF POSITION INFORMATION," which is hereby incorporated herein by reference in its entirety, which is a continuation of U.S. patent application Ser. No. 14/875,844, filed Oct. 6, 2015, now U.S. Pat. No. 9,759,817, and entitled, "METHOD AND APPARATUS FOR INTELLIGENT ACQUISITION OF POSITION INFORMATION," which is hereby incorporated herein by reference in its entirety, which is a continuation of U.S. patent application Ser. No. 13/802,574, filed Mar. 13, 2013, now U.S. Pat. No. 9,182,238, and entitled, "METHOD AND APPARATUS FOR INTELLIGENT ACQUISITION OF POSITION INFORMATION," which is hereby incorporated herein by reference in its entirety, which is a continuation of U.S. patent application Ser. No. 12/381,776, filed Mar. 17, 2009, now U.S. Pat. No. 9,074,903, and entitled "METHOD AND APPARATUS FOR INTELLIGENT ACQUISITION OF POSITION INFORMATION," which is hereby incorporated herein by reference, which is a continuation of U.S. patent application Ser. No. 11/124,475, filed May 9, 2005, now U.S. Pat. No. 8,285,484, and entitled "METHOD AND APPARATUS FOR INTELLIGENT ACQUISITION OF POSITION INFORMATION," which is hereby incorporated herein by reference, which is a continuation of U.S. patent application Ser. No. 10/397,473, filed Mar. 26, 2003, now U.S. Pat. No. 6,975,941, and entitled "METHOD AND APPARATUS FOR INTELLIGENT ACQUISITION OF POSITION INFORMATION," which is hereby incorporated herein by reference, and which claims the benefit of the following provisional patent applications: (i) U.S. Provisional Patent Application No. 60/444,198, filed Jan. 30, 2003, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (ii) U.S. Provisional patent Application No. 60/418,491, filed Oct. 15, 2002, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (iii) U.S. Provisional Patent Application No. 60/404,645, filed Aug. 19, 2002, and entitled "SYSTEM, METHOD AND APPARATUS FOR ACQUIRING, PRESENTING, MONITORING, DELIVERING, MANAGING AND USING POSITION AND OTHER INFORMATION," which is hereby incorporated herein by reference; and (iv) U.S. Provisional Patent Application No. 60/375,998, filed Apr. 24, 2002, and entitled "SYSTEM, METHOD AND APPARATUS FOR ACQUIRING, PRESENTING, MANAGING AND USING POSITION INFORMATION," which is hereby incorporated herein by reference.

This application is also related to: (i) U.S. patent application Ser. No. 10/397,472, filed Mar. 26, 2003, and entitled "METHODS AND APPARATUS TO ANALYZE AND PRESENT LOCATION INFORMATION;" (ii) U.S. patent application Ser. No. 10/397,637, filed Mar. 26, 2003, and entitled "METHOD AND SYSTEM FOR PROVIDING SHIPMENT TRACKING AND NOTIFICATIONS;" (iii) U.S. patent application Ser. No. 10/397,641, filed Mar. 26, 2003, and entitled "METHOD AND SYSTEM FOR PERSONALIZED MEDICAL MONITORING AND NOTIFICATIONS THEREFOR;" (iv) U.S. patent application Ser. No. 10/397,640, filed Mar. 26, 2003, and entitled "INEXPENSIVE POSITION SENSING DEVICE;" (v) U.S. patent application Ser. No. 10/397,474, filed Mar. 26, 2003, and entitled "METHOD AND SYSTEM FOR ENHANCED MESSAGING;" (vi) U.S. patent application Ser. No. 10/397,512, filed Mar. 26, 2003, and entitled "APPLICATIONS OF STATUS INFORMATION FOR INVENTORY MANAGEMENT.

BACKGROUND OF THE INVENTION

1. Field of the Invention

The present invention relates to position detection and, more particularly, to improved techniques for acquisition of position information.

2. Description of the Related Art

Position determining devices have become popular for motor vehicle or vessel navigation. Typically, these devices utilize the global availability of Global Positioning Systems (GPS). These device can be dedicated to particular vehicles or vessels. More recently, these position determining devices (often known as GPS receivers) have become portable.

Unfortunately, these devices, if standalone, are battery operated and not typically designed to be able to monitor position over a long duration of time. More particularly, because these devices require frequent radio-frequency communications, computational processing and information display, they consume large amounts of power and thus their battery life is limited. Also, these devices remain relatively expensive and have a relatively large form factor.

As a result, conventional position determining devices are not suitable for use in many applications due to their power consumption. Thus, there is a need for position determining devices that have reduced power consumption. It would be further advantageous if position determining devices were smaller and less expensive.

SUMMARY OF THE INVENTION

Broadly speaking, the invention relates to improved methods and systems for position acquisition and/or monitoring. The position acquisition and/or monitoring can be performed with improved intelligence so that data acquisition, transmission and/or processing is reduced, which provides improved power efficiency.

According to one embodiment of the invention, a portable position acquisition apparatus can include one or more components that have a low-power state which can be used to reduce power consumption of the position acquisition apparatus. According to another aspect of the invention, the position acquisition can be performed dependent on one or more of motion information, at least one battery level characteristic of a battery, and a change in position. According to still another aspect of the invention, the acquired position information can be transmitted to a remote device (e.g., central server) dependent on one or more of motion information, at least one battery level characteristic of a battery, and a change in position. According to still yet another aspect of the invention, a portable, battery-powered position acquisition apparatus is used to acquire position information and a solar panel provides electrical charge to its battery.

The invention can be implemented in numerous ways including, a method, system, device, apparatus, and a computer readable medium. Several embodiments of the invention are discussed below.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved methods and systems for position acquisition and/or monitoring. The position acquisition and/or monitoring can be performed with improved intelligence so that data acquisition, transmission and/or processing is reduced, which provides improved power efficiency.

According to one embodiment of the invention, a portable position acquisition apparatus can include one or more components that have a low-power state which can be used to reduce power consumption of the position acquisition apparatus. According to another aspect of the invention, the position acquisition can be performed dependent on one or more of motion information, at least one battery level characteristic of a battery, and a change in position. According to still another aspect of the invention, the acquired position information can be transmitted to a remote device (e.g., central server) dependent on one or more of motion information, at least one battery level characteristic of a battery, and a change in position. According to still yet another aspect of the invention, a portable, battery-powered position acquisition apparatus is used to acquire position information and a solar panel provides electrical charge to its battery.

In the following description, numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the invention are discussed below with reference to FIGS. 1-9. However, those skilled in the art will readily appreciate that the detailed description given herein with respect to these figures is for explanatory purposes as the invention extends beyond these limited embodiments.

Figure 1:
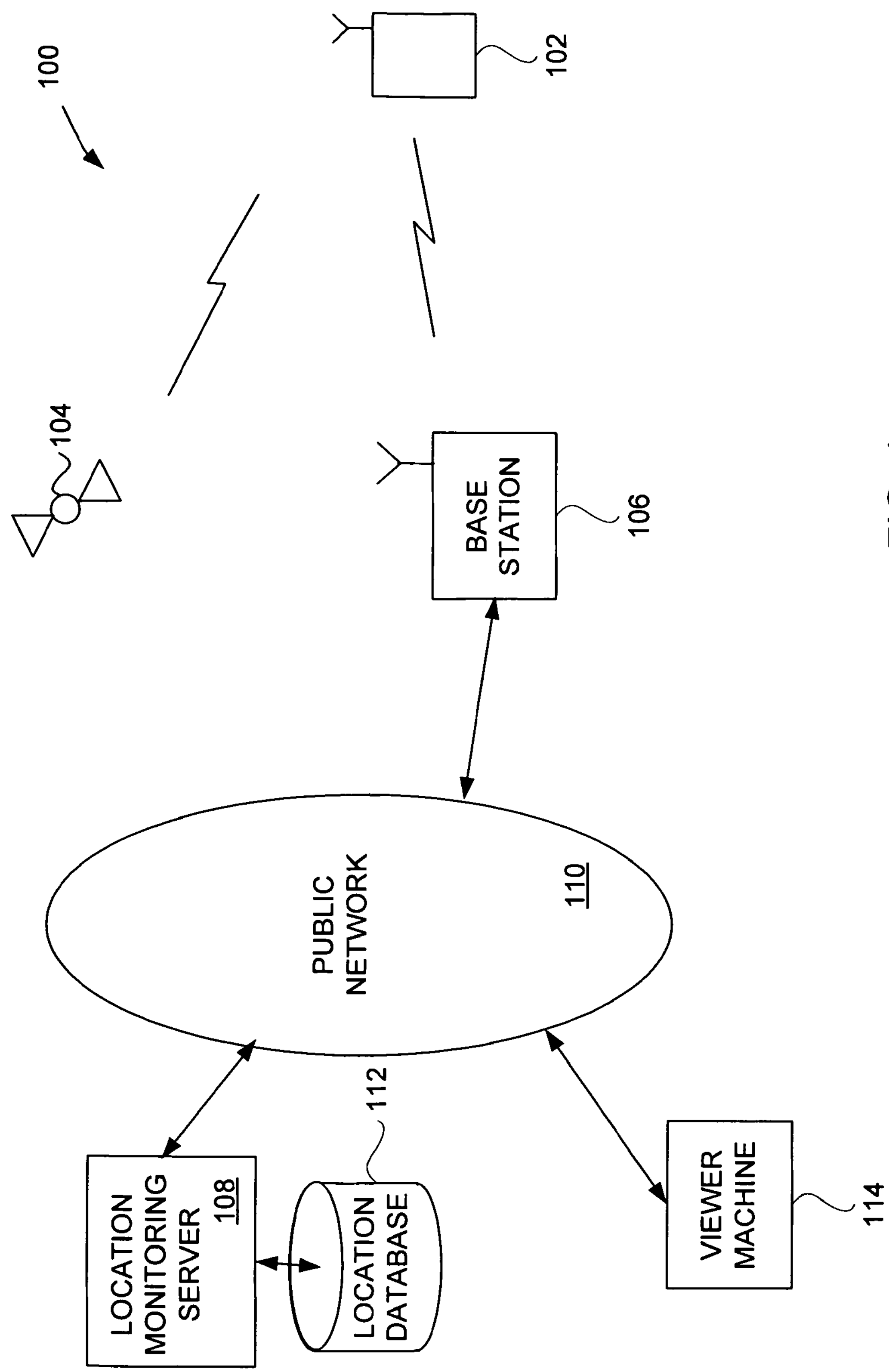
FIG. 1 is a block diagram of a location monitoring system according to one embodiment of the invention.

FIG. 1 is a block diagram of a location monitoring system 100 according to one embodiment of the invention. The location monitoring system 100 operates to monitor the location of mobile devices using a Global Positioning System (GPS). The location monitoring system 100 includes one or more mobile devices 102. The mobile devices 102 can receive position information from a GPS satellite 104. The mobile devices 102 also communicate through a wireless link to a base station 106. The base station 106 in turn can couple to a location monitoring server 108 through a public network 110. As an example, the public network 110 can include the Internet, a wide area network (WAN), or a local area network (LAN). The location monitoring server 108 typically couples to a location database 112 which serves to store location information for the mobile devices 102.

The location monitoring system 100 also permits a viewer machine 114 to interact with the location monitoring server 108 through the public network 110. In this regard, a user of the viewer machine 114 is able to interact with the location monitoring server 108 to retrieve the location (or position) information for one or more of the mobile devices 102 using the location data stored in the location database 112. Typically, such location information that is retrieved from the location database 112 is forwarded from the location monitoring server 108 through the public network 110 to the viewer machine 114 where it can be reviewed by the user of the viewer machine 114. As one example, the viewer machine 114 can be a computer, such as a personal computer. Note that the term viewer machine 114 is used in a general sense. In other words, the process of accessing location information at the viewer machine 114 is not limited to visual viewing by way of a screen display. For example, a user can review (receive) such information through audio means (e.g., voice).

Since the mobile devices 102 are mobile in nature, and thus battery powered, the tracking of the location of the mobile devices 102 can impose a power consumption difficulty for the mobile devices 102. Each time one of the mobile devices 102 captures and forwards its location to the location monitoring server 108, electronic charge from its battery is consumed for such location monitoring purposes. Hence, although the location monitoring system 100 desires to monitor the location of the mobile devices 102 on a frequent basis (e.g., at all times, limited times, periodically, on-demand), the mobile devices 102 themselves should not be unduly burdened with respect to power consumption for such purposes. According to one aspect of the invention, the mobile devices 102 operate to conserve power consumption while still permitting consistent location monitoring.

The mobile devices 102 are typically hand-held devices that operate under battery control. The mobile devices 102 incorporate location detection circuitry but can also include other circuitry to support other functions associated with the mobile devices 102. For example, the mobile devices 102 can further operate as cameras, cellular phones, portable digital assistants (PDAs), or portable computers.

Figure 2:
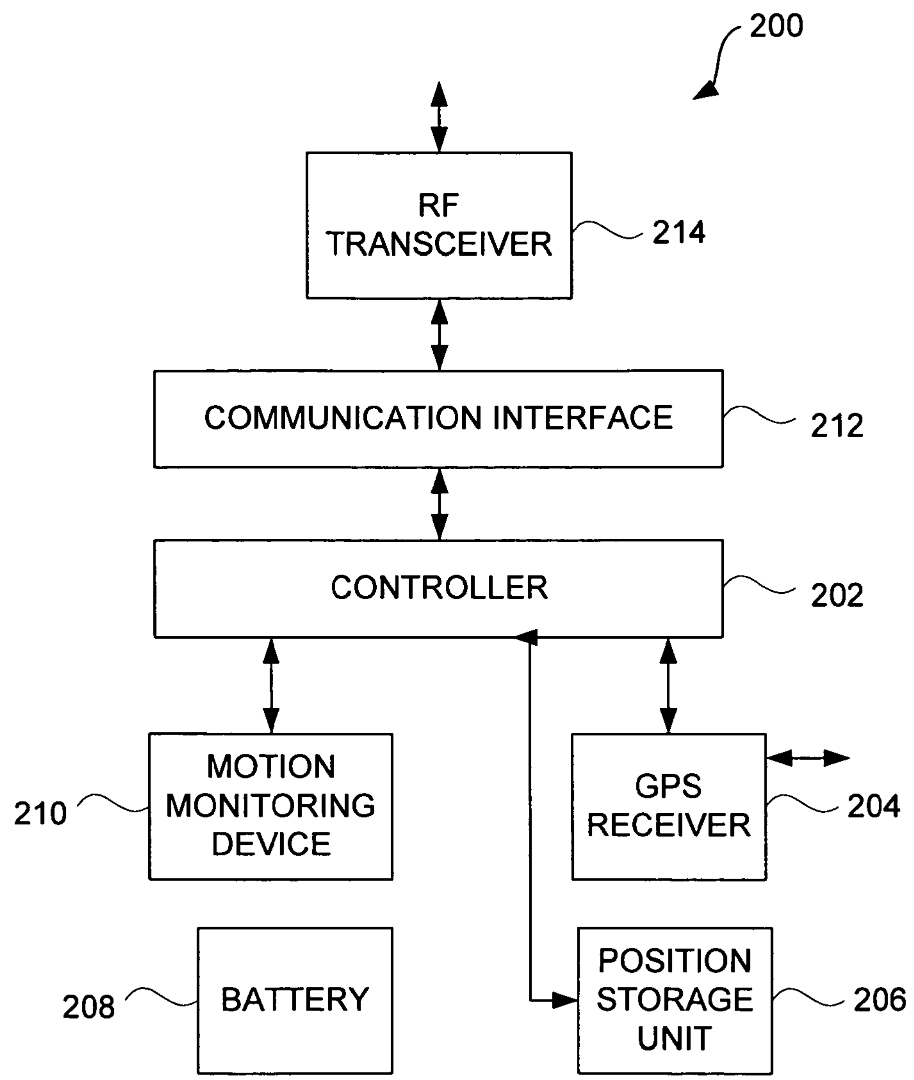
FIG. 2 illustrates a block diagram of a mobile device according to one embodiment of the invention.

FIG. 2 illustrates a block diagram of a mobile device 200 according to one embodiment of the invention. The mobile device 200 is, for example, suitable for use as the mobile device 102 illustrated in FIG. 1.

The mobile device 200 includes a controller 202 that controls the overall operation of the mobile device. The mobile device 200 provides at least location acquisition circuitry but may also include voice communication circuitry and/or data communication circuitry. Voice communication circuitry is typically found in mobile devices that operate as mobile telephones. The data communications are typically provided by mobile devices that operate to permit wireless data transfer to and from the mobile device. As shown in FIG. 2, the mobile device 200 includes circuitry for monitoring its location (or position). Although not shown in FIG. 2, additional circuitry, such as for voice or data communication or data processing, can be provided within the mobile device 200.

In one embodiment, the location acquisition circuitry of the mobile device 200 includes a GPS receiver 204. The GPS receiver 204 is utilized to receive GPS signals that are sent by a GPS satellite (such as the GPS satellite 104 illustrated in FIG. 1). The GPS receiver 204 can be controlled by the controller 202 to determine when a mobile device 200 should be receiving GPS information. When the GPS receiver 204 receives the GPS information (e.g., signals received to determine pseudo ranges) from the GPS satellite, the GPS information is typically processed by the controller 202 to produce location information. The location information is then stored by the controller 202 to a position storage unit 206. The position storage unit 206 can be a data storage device (e.g., RAM or ROM). As examples, the data storage device can be a register, semiconductor data storage, optical data storage, or magnetic data storage. It should be noted that the GPS receiver 204 can, more generally, be considered a position detection unit.

The mobile device 200 is powered by a battery 208 that is typically rechargeable. A motion monitoring unit 210 is also provided in the mobile device 200. The motion monitoring unit 210 couples to the controller 202 to provide motion information to the controller 202. The motion information is able to be determined based on one or a plurality of criteria that are monitored at the mobile device via the motion monitoring unit 210. Examples of such criteria include: acceleration, vibration, force, speed, and direction.

The motion monitoring unit 210 can be formed or constructed in a number of ways. In one embodiment, the motion monitoring unit 210 uses a micro-machined structure to sense motion. Accelerometers are known in the art and suitable for use as the motion monitoring unit 210. See, e.g., Dinsmore sensors available from Robson Company, Inc. of Erie, Pa. Various other types of sensors besides accelerometers can be additionally or alternatively used in sensing the criteria (e.g., vibration, force, speed, and direction) used in determining motion. For particularly low power designs, the one or more sensors used can be largely mechanical.

In one embodiment, by reducing the frequency at which the GPS receiver 204 is required to request, receive and resolve GPS information, the mobile device 200 is able to save power and thus extend the useful life of the battery 208. Further, the reduction in use of the GPS receiver 204 also operates to reduce the demands on wireless network bandwidth in transmitting and managing such location information.

In another embodiment, the motion monitoring unit 210 enables the GPS receiver 204 to remain in a low-power state (such as a sleep state) until an updated location for the mobile device 200 is needed. In other words, the motion monitoring unit 210 can monitor the motion of the mobile device 200 such that if only minimal motion of the mobile device 200 has been detected since the last location of the mobile device 200 was obtained utilizing the GPS receiver 204, then the controller 202 can assume (e.g., estimate) that the location of the mobile device 200 is substantially the same and thus need not wake-up (i.e., transition to normal power state) the GPS receiver 204 to acquire and process new GPS information. As a result, the GPS receiver 204 can remain in its low-power state and the controller 202 need not perform computations to resolve the GPS information to location information.

The mobile device 200 also includes a communication interface 212 and a RF transceiver 214. The communication interface 212 and the RF transceiver 214 enable the mobile device 200 to communicate with a central station, such as the base station 106 illustrated in FIG. 1. Hence, the mobile device 200 is able to wirelessly communicate with the base station 106 to provide location information to the base station 106, which then forwards the location information to the location monitoring server 108 for storage.

In general, the motion monitoring unit 210 serves to provide motion information to the controller 202. The motion information can be merely a control signal from the motion monitoring unit 210, or more complicated signals or data (e.g., position). Processing of the motion information can be performed at the controller 202, though processing could have additionally or alternatively have been performed at the motion monitoring unit 210. In any case, in one embodiment, the motion information can be used by the controller 202 to determine the degree of motion. For example, the controller 202 can measure the relative motion of the mobile device 200, such as with respect to a previous position. As another example, the motion monitoring unit 210 and/or the controller 202 can accumulate the motion of the mobile device 200 with respect to a specific previous position or status.

In one embodiment, the motion monitoring unit 210 or the controller 202 can use more than one type of criteria to identify the motion of the mobile device 200. For example, both the acceleration and speed information across a duration of time can be used to determine the distance the mobile device 200 has traveled. In yet another example, the distance the mobile device 200 has traveled can incorporate direction information. Just to illustrate, assume the mobile device 200 has traveled north at a constant speed for 10 meters and then changes 180 degrees and traveled south at the same speed for 10 meters. The mobile device 200 can sense different types of motion, e.g., speed and change of direction. The motion monitoring unit 210 and/or the controller 202 can perform calculations to determine whether the mobile device 200 has any net movement.

Figure 3:
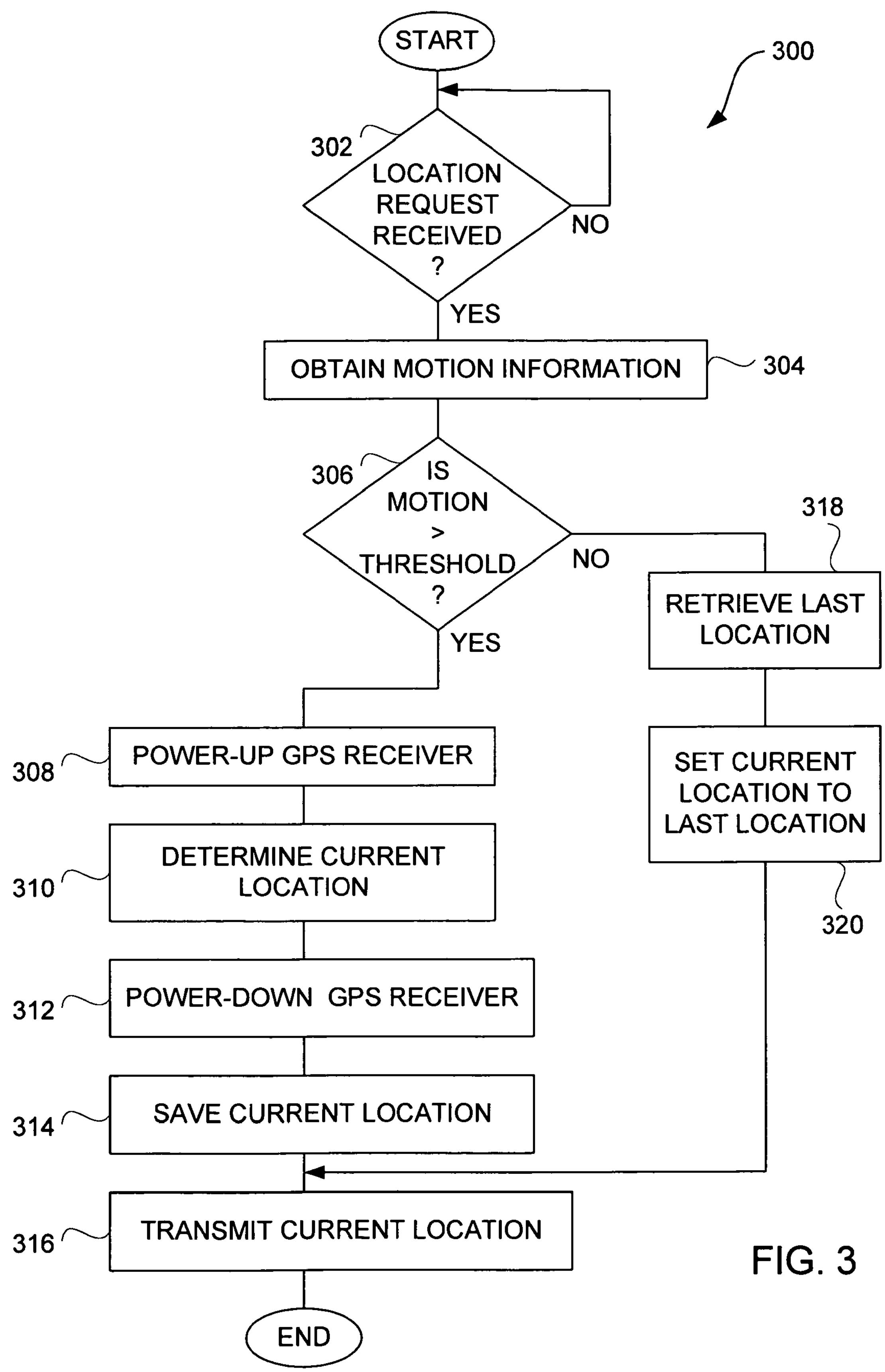
FIG. 3 is a flow diagram of location request processing according to one embodiment of the invention.

FIG. 3 is a flow diagram of location request processing 300 according to one embodiment of the invention. The location request processing 300 is, for example, performed by a mobile device, such as the mobile device 102 illustrated in FIG. 1 or the mobile device 200 illustrated in FIG. 2.

The location request processing 300 begins with a decision 302 that determines whether a location request has been received from a requestor. When the decision 302 determines that a location request has not yet been received, the location request processing 302 awaits such a request. When the decision 302 determines that a location request has been received, then motion information for the mobile device is obtained 304. For example, the motion information can be obtained from the motion monitoring unit 210 illustrated in FIG. 2. The motion information can, for example, pertain to an accumulation of motion during a time period or can pertain to a maximum motion during a time period. Motion refers to one or a combination of physical conditions on a mobile device, such as acceleration, velocity, force, vibration, etc.

Next, a decision 306 determines whether the motion is greater than a threshold amount. When the decision 306 determines that the motion is greater than a threshold amount, then the GPS receiver of the mobile device is powered-up 308. A current location for the mobile device is then determined 310 using the GPS receiver. Typically, the GPS receiver will obtain GPS information and a controller (or processor) will process the GPS information to produce a current location (or position). After the current location has been determined 310, the GPS receiver can be powered-down 312. Here, the GPS receiver is returned to a low-power state so as to conserve power. As an example, the low-power state (or powered-down state) can be a sleep mode or it can be a disabled mode. The current location is then saved 314. As an example, the current location can be saved 314 to a local storage unit, such as the position storage unit 206 illustrated in FIG. 2. The current location can be transmitted 316 to an appropriate destination. Typically, the current location would be transmitted to a location monitoring server (e.g., location monitoring server 108), and then transmitted as a data communication to the requestor, if the requestor is a remote requestor.

The current location could be transmitted separately or as a group or a batch of locations. For example, the mobile device could store the current locations and the time for such locations in the position storage unit and then transmit a group of such locations to the location monitoring server (e.g., location monitoring server 108) when needed, when convenient or when the position storage unit is nearly full. Here, the position storage unit is able to provide buffering of the locations. Alternatively or additionally, the current location could be sent to the requestor's device. Further, the current location could also be sent in a background mode if the mobile device supports other communications, for example, Short Message Service (SMS) messaging or voice communications.

On the other hand, when the decision 306 determines that the motion is not greater than the threshold, then the last location for the mobile device is retrieved 318. Typically, the last location would be retrieved from the local storage unit, such as the position storage unit 206 illustrated in FIG. 2. The current location for the mobile device is then set 320 to the last location. In other words, the current location is set to be the same as the previous location for the mobile device. Thereafter, the operation 316 can be performed to transmit the current location to the location monitoring server and/or the requestor.

Additionally, if desired, the use of a prior location or last location as the current location could be further restricted such that a location could time-out. For example, if it has been more than some time duration (e.g. 24 hours) since a last location was obtained using the GPS receiver, such location could be deemed "stale". Then the request processing 300 could activate the GPS receiver and determine a current location with operations 308-316 even though the motion for the mobile device has not exceeded the threshold.

Figure 4:
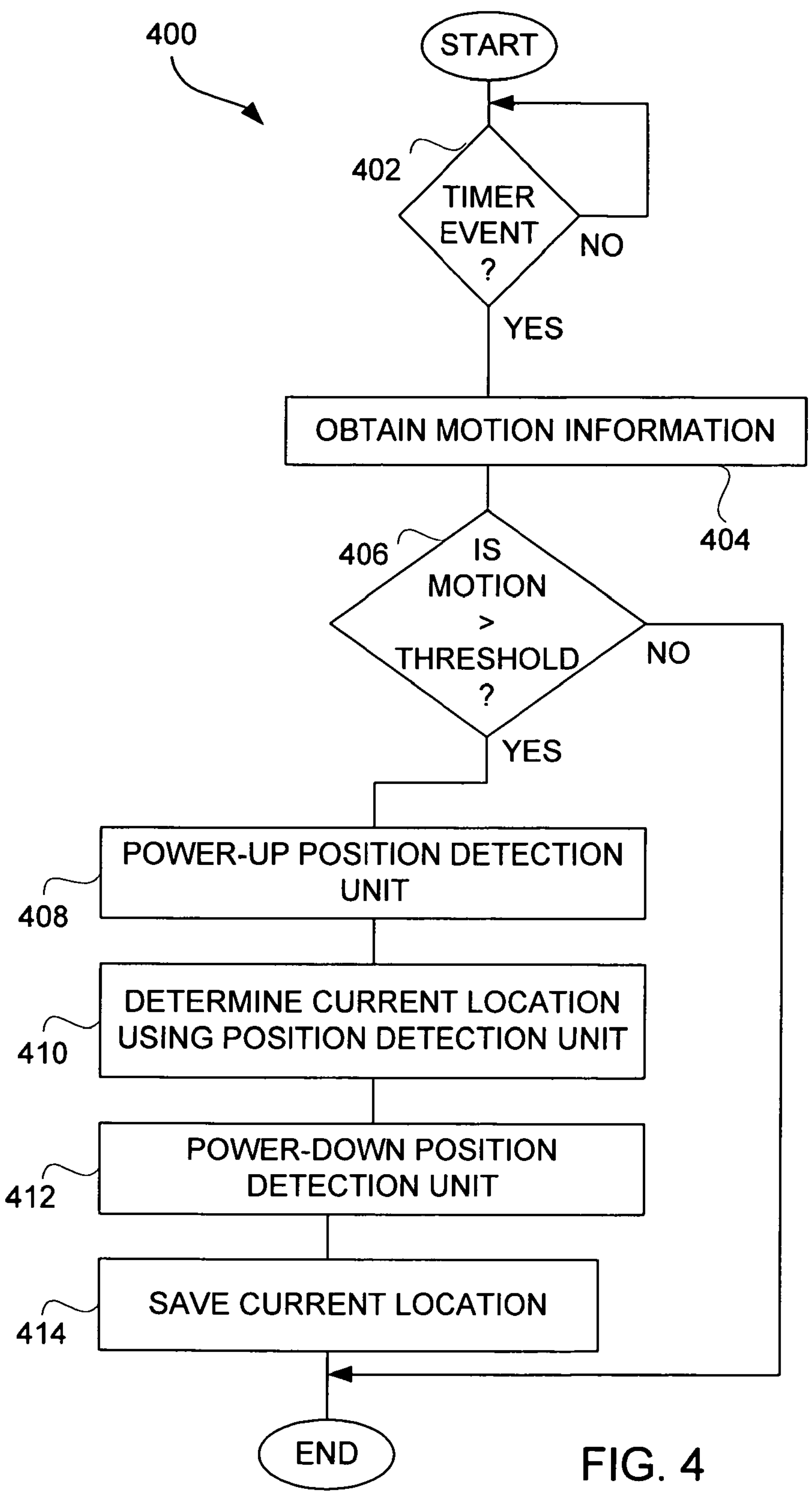
FIG. 4 is a flow diagram of location monitoring processing according to one embodiment of the invention.

FIG. 4 is a flow diagram of location monitoring processing 400 according to one embodiment of the invention. The location monitoring processing 400 begins with a decision 402 that determines whether a timer has expired. When the decision 402 determines that the timer has not yet expired, then the location monitoring processing 400 awaits such an event. In other words, the location monitor processing 400 is invoked on a periodic basis to check the location for a mobile device. Alternatively, the location monitor processing 400 could be invoked on an event basis other than time, such as a motion event, though this embodiment is discussed with reference to a timer event.

When the decision 402 determines that a timer event has occurred, then motion information is obtained 404. The motion information can be accumulated during an interval or merely a maximum motion indication during an interval, or some other motion criteria. A decision 406 then determines whether the motion is greater than a threshold. When the decision 406 determines that the motion is greater than the threshold, the GPS receiver is powered-up 408. Then, the current location is determined 410 using the GPS receiver. After the current location has been determined 410, the GPS receiver is powered-down 412. The current location is saved 414. Alternatively, when the decision 406 determines that the motion is not greater than the threshold, then the operations 408-414 are bypassed such that the motion information is utilized to avoid having to again determine a location when the amount of movement has been insufficient to cause a substantial change in location. In which case, power consumption by the GPS receiver and the processing of location information is able to be substantially reduced such that battery life is prolonged. After the operation 414, or its being bypassed, the location monitor processing 400 is complete and ends.

It should be noted that the determination of the current location at operation 410 could utilize simply GPS information received from the GPS receiver, or need not fully resolve the location of the mobile device (e.g., pseudo ranges) or some partially processed variant therefrom.

The location monitor processing 400 is suitable for around-the-clock type monitoring of the location of a mobile device. The motion criteria and the low power maintenance of the GPS receiver allow the mobile device to significantly reduce its power consumption while still providing constant location monitoring. The location monitor processing 400 is also suitable for use in having the mobile device "push" its location when it has changed (even though not being requested by a requestor). For example, the mobile device could "push" its location when a threshold condition is exceeded.

Additional power management approaches can be utilized in conjunction or in combination with those for the use of the GPS receiver. Still further, in addition to utilizing a low-power state for the GPS receiver and the use of motion information, other techniques can be utilized. For example, with respect to FIG. 4, if periodically polled, the polling frequency can be decreased if the battery charge is deemed low. For example, if the battery for the mobile device has gotten rather low, it needs recharged. However, since the battery is already low, the polling frequency could be decreased such that the lifetime of the battery can be extended in the event that the battery is not recharged promptly. In one embodiment, the duration of a timer can be extended to decrease the pooling frequency. Likewise, the threshold level could be varied depending on battery level. Further, the amount of processing performed with respect to the GPS information received from the GPS receiver and/or its resolution can be minimally processed at the mobile device to save power. Also, in the event that the location information needs to be further processed, such processing could be performed at a centralized or remote site such as the location monitoring server. Also, as noted above, the sending of the location data can be done more efficiently, such as in groups or batches, or in a background mode. Still further, the polling frequency could be increased to gather more location information if the motion information indicates that the mobile device is undergoing a high degree of motion.

Figure 5:
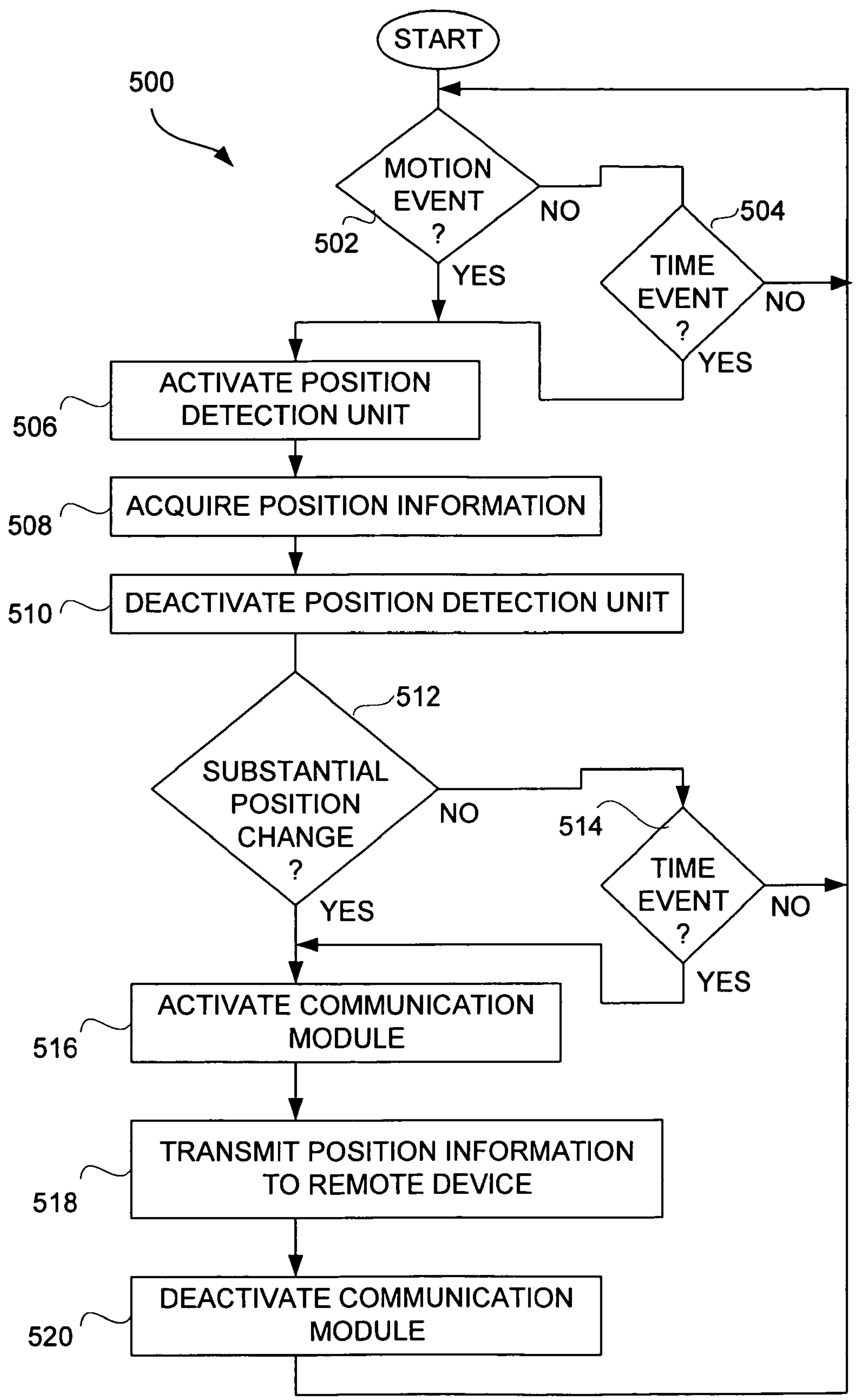
FIG. 5 is a flow diagram of power managed position monitoring according to one embodiment of the invention.

FIG. 5 is a flow diagram of power managed position monitoring 500 according to one embodiment of the invention. The power managed position monitoring 500 can, for example, be performed by the mobile device 200 shown in FIG. 2, which can be used as a position monitoring apparatus.

The power managed position monitoring 500 begins with a decision 502 that determines whether a motion event has occurred. When the decision 502 determines that a motion event has not occurred, a decision 504 determines whether a time event has occurred. When the decision 504 determines that a time event has not occurred, then the power managed position monitoring 500 returns to repeat the decision 502 and subsequent operations. In other words, the power managed position monitoring 500 is effectively invoked when a motion event has occurred or a time event has occurred. In one implementation, the time event can be set to a lengthy delay such as 24 hours so that a time event occurs every 24 hours which guarantees that one position will be obtained on a 24 hour basis regardless of motion. In one implementation, the motion event is triggered based on a threshold level. The threshold level can be dynamically changed or selected based on various conditions.

When the decision 502 determines that a motion event has occurred or when the decision 504 determines that a time event has occurred, the positioning detection unit of the position monitoring apparatus is activated 506. Then, using a position detection unit, position information is acquired 508. Thereafter, the position detection unit is deactivated 510. Here, in order to conserve power, the position detection unit remains inactive, which can pertain to powered-off, disabled, sleep, hibernate, or other low power mode. It is only when position information is to be acquired that the position detection unit is activated.

Next, a decision 512 determines whether a substantial position change has occurred. Here, the position information that has been acquired 508 is compared to a prior position information that was previously acquired. When the difference in position indicates that there has been no substantial position change, then a decision 514 determines whether a time event has occurred. Here, the time event can provide a fail safe such that a position is obtained once during the period provided by the time event regardless of change in position. Here, the time event can be the same time event or a different time event than that used with the decision 504. When the decision 514 determines that a time event has not occurred, then the power managed position monitoring 500 returns to repeat the decision 502 and subsequent operations.

On the other hand, when the decision 512 determines that a substantial position change has occurred or when the decision 514 determines that a time event has occurred, then additional processing is carried out to transmit the position information to a remote device. More particularly, a communication module of the position monitoring apparatus is activated 516. Then, the position information is transmitted 518 to a remote device. Typically, the remote device provides centralized storage and processing for position information pertaining to a plurality of position monitoring apparatuses. After the position information has been transmitted 518, the communication module is deactivated 520. Here, in order to conserve power, the communication module remains inactive, which can pertain to powered-off, disabled, sleep, hibernate, or other low power mode. It is only when position information is to be transmitted (or received) from a remote device that the communication module is activated. Following the operation 520, the power managed position monitoring 500 returns to repeat the decision 502 and subsequent operations so that subsequent motion events and time events can be similarly processed.

The power managed position monitoring 500 indicates that the position detection unit and the communication module of the position monitoring apparatus can be maintained in a low-power state until such circuitry is needed. This results in a substantial savings in power consumption by the position monitoring apparatus. Further, the position monitoring apparatus is thus suitable for long term, constant (e.g., 24/7) position monitoring. Additionally, should the position monitoring apparatus include a controller, the controller can also be set to a low-power state when position information is not being acquired or transmitted. In such a low-power state, the controller might still be able to monitor for motion events and time events and might also be capable of monitoring, or even waking itself up, when a request from a remote device is received.

Figure 6:
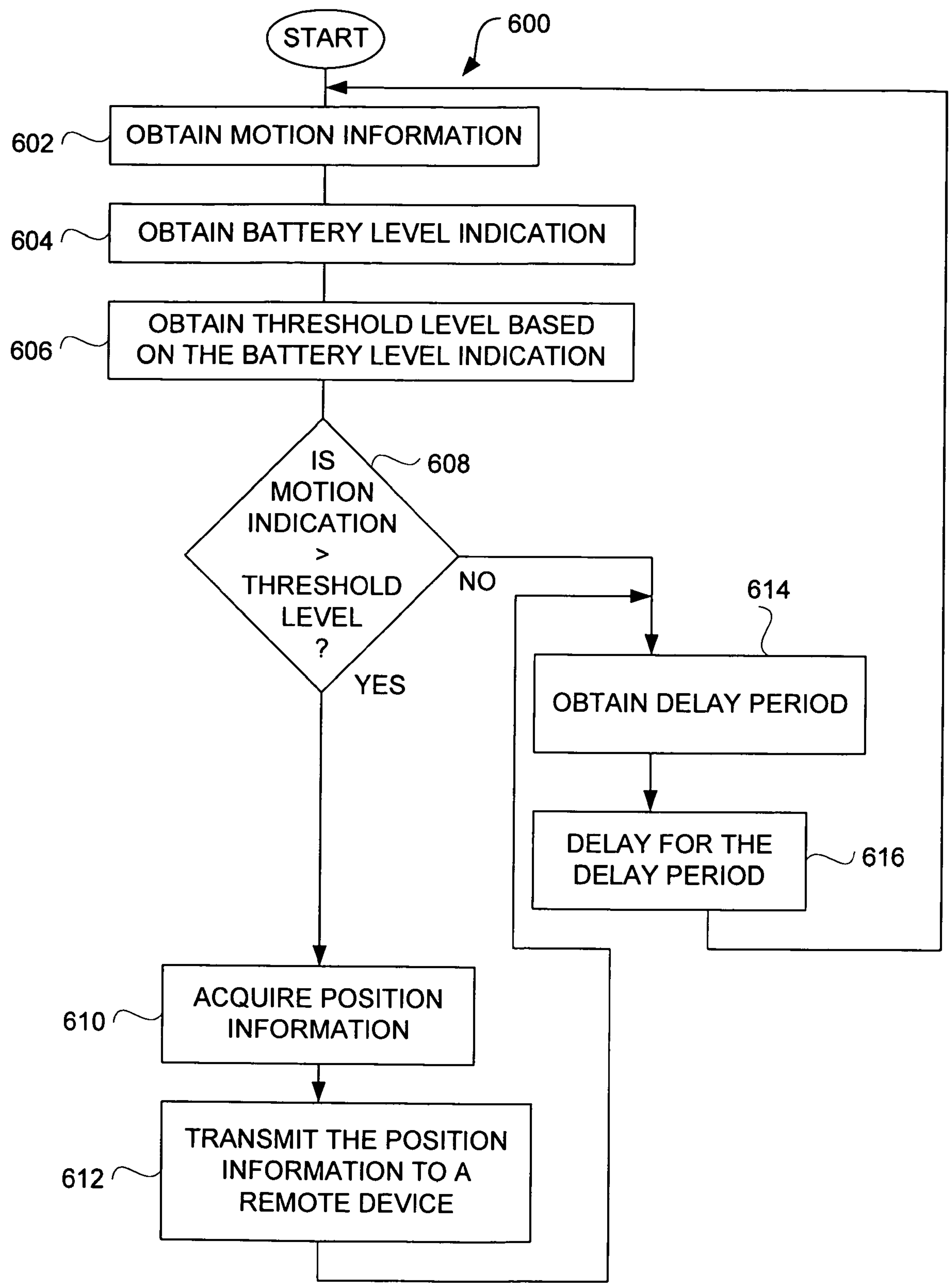
FIG. 6 is a flow diagram of power managed position monitoring according to another embodiment of the invention.

FIG. 6 is a flow diagram of power managed position monitoring 600 according to another embodiment of the invention. The power managed position monitoring 600 is, for example, performed by the position monitoring apparatus 200 shown in FIG. 2.

The power managed position monitoring 600 obtains 602 a motion indication. The motion indication pertains to motion that the position monitoring apparatus has undergone. For example, the motion indication might indicate a maximum motion that has occurred during a time period or since last evaluated, or an accumulation of motion that has occurred during the time period or since last evaluated. The motion indication might pertain to acceleration, velocity, vibration and the like. In addition, a battery level indication is obtained 604. The battery level indication might, for example, pertain to or depend on a charge level of the battery or a voltage level of the battery. Next, a threshold level is obtained 606 based on at least the battery level indication. Here, the threshold level to be utilized is variable depending upon at least the battery level indication.

A decision 608 determines whether the motion indication is greater than the threshold level. When the decision 608 determines that the motion indication is greater than the threshold level, the position information is acquired 610. The position information pertains to the position monitoring apparatus. Then, the position information is transmitted 612 to a remote device. Typically, the remote device provides centralized storage and processing for position information pertaining to a plurality of position monitoring apparatuses.

Following the operation 612, as well as following the decision 608 when the motion indication does not exceed the threshold level, a delayed period is obtained 614. The delay period can be static or dynamic. In other words, the delay period can be fixed or the delay period can vary depending upon other considerations. In one implementation, the delay period can be varied depending upon the battery level indication. For example, if the battery level indication indicates that the battery charge is low, the delay period can be increased so as to prolong the ability of the position monitoring apparatus to monitor its position. Once the delay period is obtained 614, the power managed position monitoring 600 delays 616 for the delay period. During the delay period the various components, modules, units or circuitry of the position monitoring apparatus can be placed in a low power state so as to preserve power during the delay period. After the delay period, the power managed position monitoring 600 returns to repeat the operation 602 and subsequent operations so that additional position information can be acquired and transmitted as appropriate.

In this embodiment, the threshold level is based on at least the battery level indication. As the battery level indication indicates that the charge of the battery is low, the threshold level for the motion indication comparison can be increased so that position information is acquired and transmitted less frequently, thereby conserving power of the battery that has limited available charge.

Although the power managed position monitoring 600 is capable of altering the threshold level based on the battery level indication as well as capable of altering the delay period based on the battery level indication or other considerations, it should be understood that, more generally, that position monitoring can be power managed using one or both of threshold level adjustment and delay period adjustment. For example, the power managed position monitoring 600 could use a static threshold level (e.g., static with respect to battery level) and alter the delay period based on the battery level indication.

Figure 7:
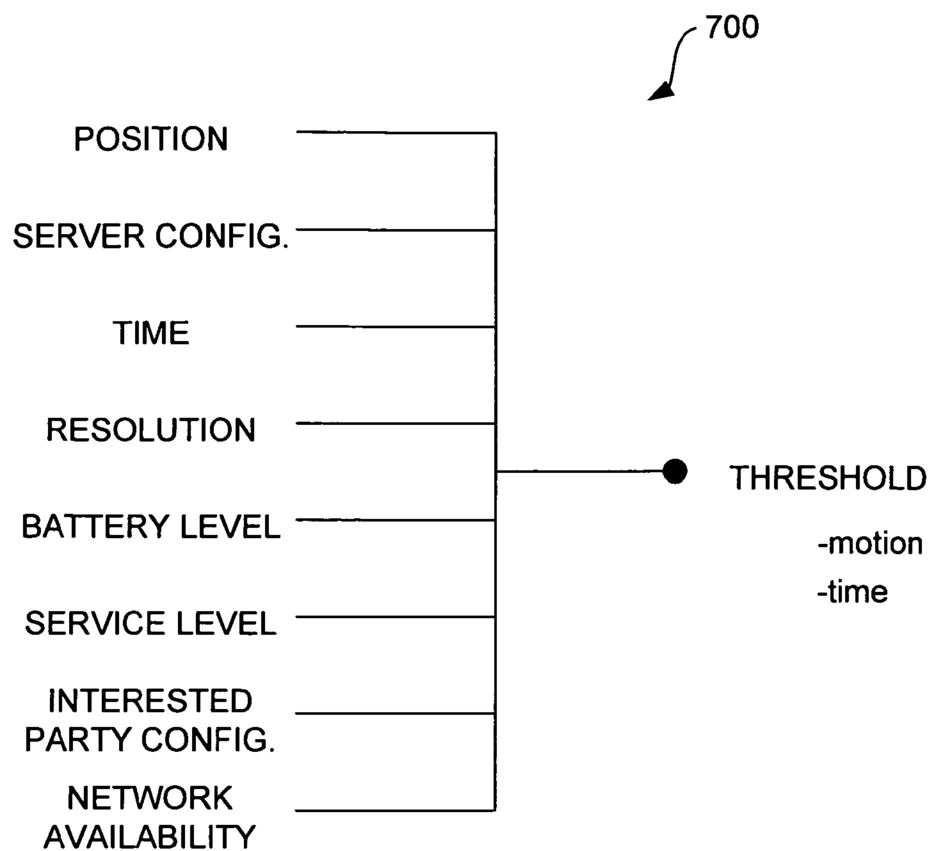
FIG. 7 illustrates an exemplary diagram of dynamic threshold dependency.

FIG. 7 illustrates an exemplary diagram of dynamic threshold dependency 700. The dynamic threshold dependency pertains to a threshold utilized by the position monitoring apparatus. For example, the threshold can be a degree of motion or an amount of time. For example, the degree of motion can pertain to a motion threshold utilized in the decision 608 of the power managed position monitoring 600 shown in FIG. 6, and the amount of time can pertain to a time threshold utilized by the operation 614 of the power managed position monitoring 600 shown in FIG. 6. As another example, the degree of motion can be used with the motion event at the decision 502 of the power managed position monitoring 500 shown in FIG. 5, and the time events at the decisions 504 and 514 of the power managed position monitoring 500 shown in FIG. 5.

In any case, the thresholds can vary or depend upon one or more various considerations. These considerations include, as illustrated in FIG. 7, one or a combination of position, server configuration, time, resolution, battery level, service level, interested party configuration, and network availability.

The threshold can vary depending upon the position of the position monitoring apparatus. Consequently, position information could be acquired more often in some positions and less often in other positions. For example, a certain part of town where the layout is quite complicated, with many closely-spaced one-way streets, might require more frequent acquisition of position information. However, a rural area may lead to less frequent acquisition of position information.

The server configuration can pertain to that configuration of a remote device (e.g., remote server) that provides centralized storage and management of position information of many position monitoring apparatuses. Here, the server configuration can control the one or more thresholds utilized so that the position information is obtained in accordance with the server configuration. Although the applications can vary, one example is that a server may want to set limits on position acquisition or transmission of remote devices.

The thresholds can also vary with time. For example, during peak use periods of the remote device, the thresholds can be higher so that less position information is acquired. This can be because during peak use periods, the bandwidth becomes limited. Also, power consumption is typically higher during peak use. This can be done by increasing the thresholds during peak time to discourage usage. In contrast, during non-peak use periods, the thresholds can be set lower. From a different perspective, the peak use can refer to the peak use of the position monitoring apparatus. Then, during certain period of time, if a user desires more frequent position information, then the thresholds can be lower during those periods so that more position information is acquired.

A resolution for the position information can be set by a remote user through the remote server and/or can be set directly on the position monitoring apparatus. For example, the position monitoring apparatus can permit a user to set a resolution, such as low, medium or high resolution. Depending upon the type of resolution being selected, the thresholds can vary so that the desired resolution can be achieved.

The battery level can affect the thresholds as noted above.

Thresholds can be changed according to the type of subscriptions or service charges. For example, the system providing the capabilities of the location monitoring services may provide different service levels for the users of the system. In which case, the different service levels can signal different threshold levels. This allows those users that have agreed to utilize more expensive service levels to obtain improved, high end or better resolution position information.

Interested parties can interact with the remote device or server through a web interface. As such, interested parties can themselves request configuration or monitoring capabilities through the web interface. The interested party can change configurations to affect the threshold levels.

Still further, network availability can affect the threshold levels. For example, when network availability is low, the threshold levels can be increased. On the other hand, when network availability is high, the threshold levels could be decreased.

The invention also relates to improved approaches for monitoring status of articles being shipped. The monitoring can produce notifications to interested parties. The notifications typically contain status information pertaining to the articles being shipped. Alternatively, interested parties can gain access to status information pertaining to the articles being shipped via a website. According to one embodiment, the status information includes at least position (location) information and shipping conditions information.

Figure 8:
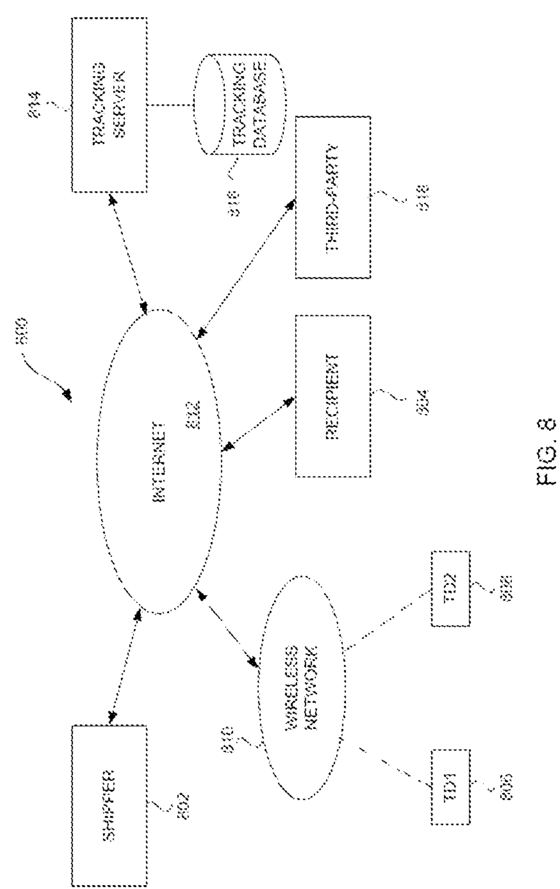
FIG. 8 is a block diagram of an article shipment notification system according to one embodiment of the invention.

FIG. 8 is a block diagram of an article shipment notification system 800 according to one embodiment of the invention. The article shipment notification system 800 provides web-based article shipment management capable of not only tracking the shipment of articles but also providing notifications to users of the system.

The article shipment notification system 800 includes a shipper 802 and a recipient 804. Typically, the article shipment notification system 800 would support multiple shippers and multiple recipients. However, in the embodiment shown in FIG. 8, only the shipper 802 and the recipient 804 are illustrated. It is assumed that an article is being shipped by the shipper 802 to the recipient 804. A shipper is a person, entity or associated computing device that is responsible for or associated with shipping an article, and a recipient is a person, entity or associated computing device to which the article is being shipped.

In order to track the location and shipping conditions of the article being shipped from the shipper 802 to the recipient 804, a tracking device (TD1) 806 is provided within or attached to the article being shipped. Additionally, a second tracking device (TD2) 808 is also illustrated in FIG. 8 which could be used to track another article. The first tracking device 806 and the second tracking device 808 are coupled to a wireless network 810. In general, the article shipment notification system 800 supports many different tracking devices. Typically, for each article being tracked, the article shipment notification system 800 would use a separate tracking device.

The wireless network 810 is coupled to the Internet 812. Further, a tracking server 814 is coupled to the Internet 812. The tracking server 814 also couples to a tracking database 816. The Internet 812 can be replaced by other data networks (e.g., enterprise network, regional network, Local Area Network, or Wide Area Network).

While an article is being shipped from the shipper 802 to the recipient 804, the first tracking device 806 gathers status information associated with the article. The status information includes at least position (location) information and/or shipping conditions information. The position information is obtained typically from a global positioning system (GPS) receiver within the first tracking device 806. The position information can be obtained or augmented by a local positioning system such as utilized with a local network (e.g., Bluetooth, Wi-Fi, etc.). The shipping conditions information pertains to conditions of or surrounding an article during its shipment. The shipping conditions information can vary with application. Examples of shipping conditions that can be provided within shipping conditions information include one or more of vibration, acceleration, speed, or direction of travel of, or force or pressure on, the article. Other examples of shipping conditions that can be provided within shipping conditions information include one or more of temperature, humidity, pressure, gaseous or liquid states, chemical compositions, wind speed, color composition, scent, light, sound, smoke, particle or radiation (e.g., infrared radiation).

The status information that is obtained by the first tracking device 806 is sent by the first tracking device 806 to the tracking server 814 via the wireless network 810 and the Internet 812. The tracking server 814 stores the status information pertaining to the first tracking device 806 into the tracking database 816 such that it is associated with the particular article being shipped. The tracking server 814 tracks the shipment of various articles, and thus stores status information pertaining to the particular articles being shipped.

As the article is being shipped, the tracking server 814 can also monitor the status information associated with the first tracking device 806 (as well as other tracking devices used with the article shipment notification system 800). The tracking server 814 can produce and send various notifications to shippers and/or recipients of articles being shipped using the article shipment notification system 800. More particularly, the tracking server 814 can monitor the status information provided by the first tracking device 806 and determine whether and when to send notifications to either the shipper 802 or the recipient 804, or both.

In one embodiment, the shipper 802 and/or the recipient 804 can provide notification criteria to the tracking server 814. The shipper 802 and the recipient 804 are coupled to the Internet 812 and thus can supply notification criteria to the tracking server 814 (as well as receive notifications from the tracking server 814). The notification criteria can specify the channel, timing and nature of the notifications to be received. The notification messages can be transmitted through different channels, such as electronic mail, text message (e.g., page, instant message, etc.), voice call, and facsimile. The timing, for example, can be periodic (e.g., daily) or on events or conditions. The nature of the notification messages can vary based on circumstances and/or user preferences. For example, the user might only desire urgent messages and not messages of lesser priorities. As another example, the user might want to receive messages in an abbreviated format as opposed to a detailed format. As still another example, the user might want to receive warning messages or messages indicating that corrective action is suggested, but opt not to receive regular status messages. In one embodiment, the notification criteria can also be considered user configuration data.

The article shipment notification system 800 can allow the shipper 802 and the recipient 804 to interact with the tracking server 814 through a web interface so that such users are able to configure or set-up to receive certain notifications. The web interface can facilitate a user in arranging to receive notifications by indicating notification criteria. For example, through use of the web interface, a user can make user selections to indicate the notifications to be received and where and by what channels the notifications are to be provided.

The article shipment notification system 800 can provide various different notifications to interested users, such as the shipper 802 and the recipient 804. For example, the shipper 802 might receive a notification that the article shipment has been delayed, a notification that the article has been delivered (arrived at the destination), a notification that shipping conditions violations have occurred, or a notification of the position of the article. For example, the recipient 804 might receive notifications such as a notification that an article has been shipped identifying the recipient as the person or entity receiving the article, a notification that an article being shipped to the recipient is nearby, and a notification that an article will be delivered to the recipient shortly (optionally including an estimated delivery time), a notification of shipping conditions violations, or a notification of the position of the article.

The article shipment notification system 800 can also include at least one third-party 818. The third-party 818 is a user interested in the shipment of the article other than the shipper 802 or the recipient 804. The article shipment notification system 800 can operate (or be configured to operate) to provide certain notifications to the third-party 818. The above-mentioned web interface can be used to configure or set-up such notifications. As examples, the third-party 818 can represent a shipping entity, an insurance company, a management organization, a financial organization, etc.

In one embodiment, the notifications can have different levels. The level of a notification can depend on security clearance, authorization, ranks within companies, or the recipient. For example, a notification directed to an insurance company might contain all available status information. In another example, a notification directed to a recipient of the article might only contain selected types/portions of status information (e.g., time of arrival but not humidity information).

The notification can be initiated by a server, such as the tracking server 804, or on-demand by a requestor (e.g., interested user).

The invention is suitable for asset management, such as tracking location/position of assets and monitoring conditions of assets. Assets can, for example, include: packages, purchased goods, moving boxes/creates, and pallets.

The position resolution can be enhanced through use of a community layout and/or profile information.

Figure 9:
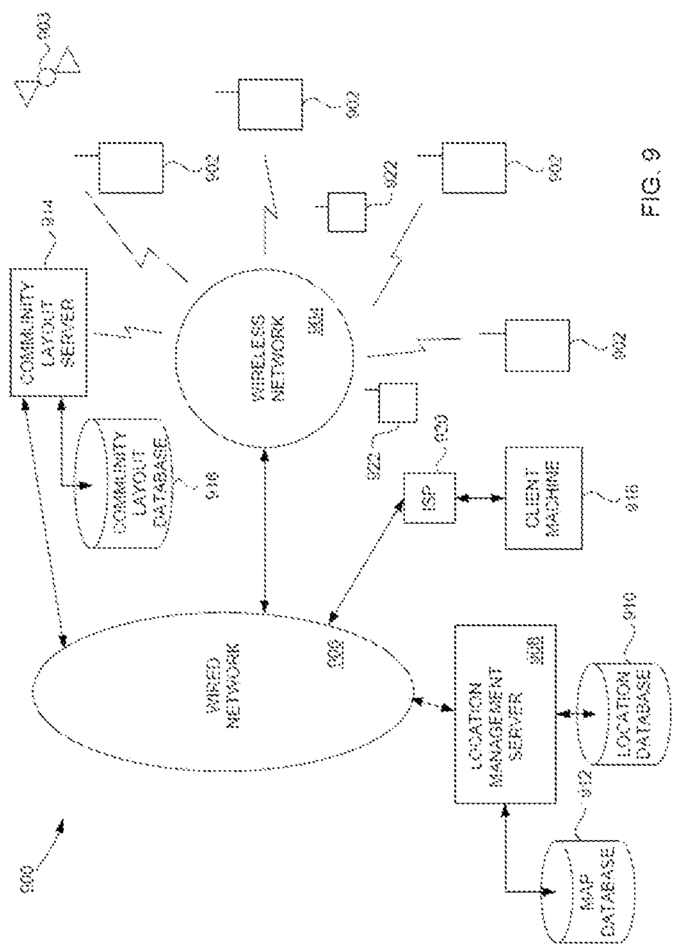
FIG. 9 is a block diagram of an object tracking system according to one embodiment of the invention.

FIG. 9 is a block diagram of an object tracking system 900 according to one embodiment of the invention. The object tracking system 900 can be used to track various objects including packages, humans, pets and the like. The object tracking system 900 includes a plurality of wireless devices 902. These wireless devices 902 are provided with or proximate to objects being tracked by the object tracking system 900. These mobile devices 902 have GPS receivers that can receive GPS position information from a GPS system 903. The acquisition of such position information can be performed on demand, periodically or on need. The mobile devices 902 communicate over wireless links with a wireless network 904. The wireless network 904 then couples to a wired network 906. A location management server 908 is coupled to the wireless network 906. The location management server 908 provides centralized storage of the location information for each of the mobile devices 902 in a location database 910. A map database 912 is also coupled to the location management server 908. The map database 912 can directly connect to the location management server 908 or can reside elsewhere on the wired network 906. The location management server 908 can interact with the map database 912 to convert position information provided by the GPS information into map coordinates, street addresses, etc.

In addition, the object tracking system 900 also includes a community layout server 914. The community layout server 914 can be coupled to the wired network 906 or the wireless network 904. In one embodiment, a community can be associated with a commercial building, a shopping mall, a residential community and the like. The community layout server 914 interacts with a community layout database 916 to resolve locations, such as street addresses and cross streets, into more intelligible locations in a community. For example, instead of a street address, the locations can pertain to points of interest with respect to the community. As an illustration, in the case of a commercial building, with five floors, the community layout database 916 would convert the GPS information (plus any additional sensor information relevant to making the determination also provided by the mobile device 902, such as altitude and direction) to obtain a community location or point of interest. For example, using the GPS position information together with other sensor information, the community layout server 914 can interact with the community layout database 916 to precisely locate a particular mobile device 902 to a particular point of interest. In the case of the commercial building with five floors, the mobile device 902 can be pinpointed to the third floor which pertains to the corporation Acme, Inc. The point of interest or community position can then be sent from the community layout server 914 through the wired network 906 to the location management server 908 which then in turn stores the community position or point of interest in the location database 910 as the position of the particular mobile device 902.

Once the location database 910 has the positions of the mobile devices 902, when subsequent position data is sent to the location management server 908, these positions are suitably updated in the location database 910. Additionally, other of the mobile devices 902 or a representative client machine 918 coupled through an Internet Service Provider (ISP) 920 to the wired network 906 can be permitted to access the locations of one or more of the mobile devices 902. Assuming that the requesting party is allowed access to said position information, the request for such information is processed by the location management server 908. When permission is granted, the locations desired are retrieved from the location database 910 and returned to either the requesting mobile devices 902 or the requesting client machine 918. In a similar manner, access to other non-location information (i.e., additional sensor information or conditions information) pertaining to the mobile devices 902 can be available.

In one embodiment, the client machine 918 or a particular one of the mobile devices 902 can set up a private or semi-private web page that is hosted by a server (e.g., the location management server 908 or other server) on the wired network 906. Then, the page can be customized to monitor the location of a number of the mobile devices 902. Hence, thereafter, the requestor need only access the customized web page to obtain the current position information for such mobile devices. With such an embodiment, a web page could be provided to track a plurality of packages being transported from a warehouse to a customer. In another embodiment, a similar web page can be setup to allow a parent to track the position of mobile devices that are affixed to his children such that the parent can easily monitor the position of his children. In this example, the object tracked is a living being (e.g., person).

The object tracking system 900 could also be augmented by wireless profile devices 922. These profile devices 922 can wirelessly couple to the mobile devices 902 using the wireless network 904. The profile devices 922 could be short range transmitters or transceivers. The profile devices 922 could store one or more profiles for a particular location in which they reside.

Hence, the mobile device 902 can wirelessly communicate with the profile device 922, if available, to acquire a profile pertaining to its location. For example, with the profile device 922 placed in the office building of Acme, Inc., when the mobile device 902 is in such office building, the mobile device 902 can acquire the profile from the proximate profile device 922. The profile can include the business name, its location, contact information for the business, etc. Thereafter, some or all of the profile information can be stored in the mobile device 902 and/or forwarded to the location management server 908 or other server for storage. Hence, the location provided by the profile may be more exacting and descriptive than the GPS position, such that the location of the mobile device 902 can be better determined.

In some cases it may be useful to control or limit the wireless communications with respect to the profile devices 922 so that the mobile devices 902 do not inadvertently receive the wrong profile. Various techniques can be utilized to provide control over the wireless communications. For example, the profile device 922 may or may not use a directional antenna. As another example, the profile device 922 could also control (e.g., limit) its transmission power.

In one embodiment of package tracking and monitoring, a GPS-enabled mobile device is attached to a package. As the package travels, the mobile device periodically sends its position information wirelessly to a center. This can be done, for example, through a cellular connection. The center keeps track of the package's location, and can post its path on a Web site. A user might have to pay to access the location information. For example, at 3 am in the morning, the user can log into the site, and enter a password to find out that the package is on the 9th floor of the Empire State Building (e.g., it destination), or more particularly the package is at the office of Acme, Inc. on the 9th floor of the Empire State Building.

In one embodiment, in addition to position information, other identifying information can also be automatically included based on radio frequency identification (RFID) tags. The RFID tags typically include memory chips equipped and radio antennas. They can be attached to objects (or people) to transmit data about the objects. Typically, the memory chips do not include tremendous amount of information. They may only have 2 kilobytes of data, sufficient to encode, such as a serial number, where and when the product was manufactured, and other relevant information. These tags can come in a number of configurations. For example, an active tag uses a battery-powered transponder to emit a constant signal carrying the identifying information programmed into the chip. Active tags are more applicable to situations where readers are not close to the tags. A semi-passive tag likewise has a battery, but may not be activated until it receives a signal from a reader. They are more applicable to situations that do not need continuous tracking. A passive tag has no battery; its antenna extracts power from the reader's radio wave signal to transmit the identifying information on the chip. Passive tags are typically relatively inexpensive, but may have to be within a few feet of a reader to extract power. The tags can provide identifying information to the corresponding positioning information, which may also include temporal information. Together, the location and identification of assets can be automatically tracked.

In still another embodiment, personalized asset management or object tracking can be provided. For example, a user can track a package or object being shipped at her convenience. Such tracking can be achieved independent of a shipping entity that ships the package. A representative scenario is as follows. A user acquires a location-aware (e.g., GPS-aware) mobile communication device, such as a limited-functionality mobile telephone or 2-way pager, and places the mobile communication device in or on the package or object. The user makes note of the identifier for the mobile communication device. Then, periodically or on-demand, the user can determine the precise location of her package. In one implementation, the user (or a server on the user's behalf) sends a message to the mobile communication object. The message can be a voice or text message, or other form of data, that simply requests the mobile communication device to get its present location. The mobile communication device then determines its location. The mobile communication device can determine its location, for example, by directly using a GPS receiver or indirectly via another device in its immediate vicinity having GPS awareness. Further, battery lifetime can be conserved using the intelligent GPS information acquisition approaches noted in U.S. Provisional Patent Application No. 60/375,998. The mobile communication device then replies back (e.g., through voice or text message) to the user (or server) to inform of its present location. The user can, for example, call or page the mobile communication device and get the reply message. Alternatively, the user need only access the server to access the location data it holds for the package or object associated with the mobile communication device. The server can also automatically track these mobile communication device and alert the users when problems or delays in its transport are identified. Further, alerts or message could notify a recipient or sender of an object or package when the same is determined to be in-route, arrived at and/or proximate to its destination. Besides location, the reply message could also provide other information such as velocity, temperature, humidity, pressure, forces or stresses.

In one embodiment, the mobile device (mobile communication device) can include a solar panel. The solar panel can provide electrical power for the mobile device. The solar panel can thus charge a battery used to power the mobile device and/or itself power the mobile device. When the mobile device is affixed to a person to be monitored, the solar panel can remain at least partially exposed to the outside environment so as to be able to receive light. The solar panel can be integrated with the housing of the mobile device or can be separate and coupled to the mobile device via one or more wires (e.g., a cable).

The present invention has described one or more GPS devices as to identify a location. However, the present invention is not limited to using GPS devices. In certain situations, other wireless or mobile devices can also serve as location-designating devices or position detection units, such as devices based on GSM technologies, Bluetooth or Wi-Fi technologies. Through the techniques of triangulation, these devices can also designate a location. Such triangulation techniques should be known to those skilled in the art.

As noted above, the location monitoring provided through used of the mobile devices can be used to monitor location of objects. The objects whose location is being monitored can vary with application. Examples of objects that can be monitored include people, animals (e.g., pets), articles (e.g., packages, vehicles, vessels), or other assets.

A number of embodiments have been described based on a mobile device. Generally speaking, the mobile device can be a cell phone, a personal digital assistant, a pager, camera, a personal computer or other devices with communication capabilities. The form factor of the mobile device can be small, such as wearable, pager sized or smaller, or pocket sized. Additional information on mobile devices is provided in U.S. patent application Ser. No. 10/397,640, filed Mar. 26, 2003, and entitled "INEXPENSIVE POSITION SENSOR," which is hereby incorporated herein by reference.

The above-described systems, devices, methods and processes can be used together with other aspects of a monitoring system, including the various aspects described in: (i) U.S. Provisional Patent Application No. 60/444,198, filed Jan. 30, 2003, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (ii) U.S. Provisional Patent Application No. 60/418,491, filed Oct. 15, 2002, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (iii) U.S. Provisional patent Application No. 60/404,645, filed Aug. 19, 2002, and entitled "SYSTEM, METHOD AND APPARATUS FOR ACQUIRING, PRESENTING, MONITORING, DELIVERING, MANAGING AND USING POSITION AND OTHER INFORMATION," which is hereby incorporated herein by reference; and (iv) U.S. Provisional Patent Application No. 60/375,998, filed Apr. 24, 2002, and entitled "SYSTEM, METHOD AND APPARATUS FOR ACQUIRING, PRESENTING, MANAGING AND USING POSITION INFORMATION," which is hereby incorporated herein by reference.

The various embodiments, implementations, features and aspects of the invention noted above (including those incorporated by reference) can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. The invention, or at least certain software portions of the invention, can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield different advantages. One advantage of the invention is that position information can be acquired in a power efficient manner. Another advantage of the invention is that position monitoring can be achieved over an extended period. Still another advantage of the invention is that position information of objects being monitored can be centrally maintained and available through access to a website (e.g., monitoring server). Yet another advantage of the invention is that position monitoring apparatus can be inexpensive and have a small form factor, and thus be suitable for many uses.

The many features and advantages of the present invention are apparent from the written description, and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A battery-powered position acquisition apparatus, comprising:

a position detection unit that acquires position data pertaining to said position acquisition apparatus;

a communication interface for data communication over at least a wireless network; and a controller operatively connected to said position detection unit and said communication interface, said controller being configured to receive a configuration request via at least the communication interface, the configuration request requesting that status updates from said position acquisition apparatus be provided in accordance with a specified status update rate, and said controller subsequently operates to produce a status update in accordance with the specified status update rate by at least accessing position information of the position acquisition apparatus determined using at least the position data acquired by said position detection unit, the status update including at least the position information, wherein the configuration request received via the communication interface denotes the specified status update rate to be utilized by said position acquisition apparatus, and wherein the controller is configured to initiate transmission of the status update produced in accordance with the specified status update rate via at least said communication interface.

2. A battery-powered position acquisition apparatus as recited in claim 1, wherein said position acquisition apparatus operates to periodically transmit successive status updates in accordance with a rate that is dependent on the specified update rate.

3. A battery-powered position acquisition apparatus as recited in claim 2, wherein the position acquisition apparatus includes a motion sensor, and wherein the position acquisition apparatus operates to stop the successive status updates based on a determination that data from the motion sensor indicates that the position acquisition apparatus is not moving.

4. A battery-powered position acquisition apparatus as recited in claim 2, wherein the position acquisition apparatus includes a motion monitoring unit, and wherein the position acquisition apparatus operates to reduce rate of the successive status updates to a minimum rate lower than the specified update rate based on a determination that data from the motion monitoring unit indicates that the position acquisition apparatus is not moving.

5. A battery-powered position acquisition apparatus as recited in claim 2, wherein the position acquisition apparatus includes a motion sensor, and wherein the position acquisition apparatus operates to reduce rate of the status updates based on data from the motion sensor.

6. A battery-powered position acquisition apparatus as recited in claim 2, wherein the position acquisition apparatus includes a motion sensor, and wherein the position acquisition apparatus operates to:

determine an amount of movement of the position acquisition apparatus based on data from the motion sensor; and alter a rate of the status updates up or down depending on the amount of movement.

7. A battery-powered position acquisition apparatus as recited in claim 2, wherein the position acquisition apparatus includes a motion monitoring unit, and wherein the position acquisition apparatus operates to:

determine an amount of movement of the position acquisition apparatus based on data from the motion monitoring unit;

alter a rate of the status updates up or down depending on the amount of movement; and ensure that, notwithstanding amount of movement, the rate of the status updates is at least at a minimum rate, the minimum rate being greater than zero.

8. A battery-powered position acquisition apparatus as recited in claim 1, wherein said position acquisition apparatus includes or couples to a battery, and wherein said controller is further configured to: determine whether a charge level of said battery is deemed low, and reduce how frequently the status updates are wirelessly transmitted when it is determined that the charge level of said battery is deemed low.

9. A battery-powered position acquisition apparatus as recited in claim 8, wherein the determining whether the charge level of said battery is deemed low is based on a threshold level.

10. A battery-powered position acquisition apparatus as recited in claim 1, wherein said position acquisition unit comprises a GPS receiver.

11. A battery-powered position acquisition apparatus as recited in claim 1, wherein said position acquisition apparatus is used to track location of an asset or object.

12. A method for acquiring a status update from a portable, battery-powered status acquisition apparatus, the status acquisition apparatus including at least a position detection unit for acquiring position data and a communication interface for data communication over one or more wireless networks, the method comprising:

receiving a configuration request via at least the communication interface, the configuration request requesting that status updates from the status acquisition apparatus be provided in accordance with a specified status update rate, the configuration request denoting the specified status update rate to be utilized by the status acquisition apparatus;

acquiring position data via the position detection unit;

producing a status update in accordance with the specified status update rate, the status update including or being based on at least the position data acquired by the position detection unit; and transmitting, via the communication interface, the status update in accordance with the specified position update rate.

13. A method as recited in claim 12, wherein the method comprises:

repeating the acquiring, the producing and the transmitting for a plurality of successive status updates.

14. A method as recited in claim 13, wherein the transmitting of each of the plurality of successive status updates are periodically performed in accordance with the specified update rate.

15. A method as recited in claim 14, wherein the status acquisition apparatus includes a motion sensor, and wherein the method comprises:

stopping the successive status updates in accordance with the specified update rate based on a determination that data from the motion sensor indicates that the status acquisition apparatus is not moving.

16. A method as recited in claim 15, wherein the method comprises:

subsequently providing another status update as per a time limit even though data from the motion sensor indicates that the status acquisition apparatus is still not moving.

17. A method as recited in claim 15, wherein the method comprises:

subsequently resuming the successive status updates in accordance with the specified update rate when data from the motion sensor indicates that the status acquisition apparatus is again moving.

18. A method as recited in claim 14, wherein the status acquisition apparatus includes a motion sensor, and wherein the method comprises:

reducing rate of the successive status updates to a rate lower than the specified update rate based on a determination that data from the motion sensor indicates that the status acquisition apparatus is not moving.

19. A method as recited in claim 13, wherein the status acquisition apparatus includes a motion monitoring unit, and wherein the method comprises:

reducing rate of the successive status updates to a minimum rate lower than the specified update rate based on a determination that data from the motion monitoring unit indicates that the status acquisition apparatus is not moving.

20. A method as recited in claim 12, wherein the status acquisition apparatus includes a motion monitoring unit, and wherein the method comprises:

determining an amount of movement of the status acquisition apparatus based on data from the motion monitoring unit;

altering a rate of the status updates up or down depending on the amount of movement; and ensuring that, notwithstanding amount of movement, the rate of the status updates is at least at a minimum rate, the minimum rate being greater than zero.

21. A method as recited in claim 12, wherein the status acquisition apparatus is used to track location of an asset or object.

22. A method as recited in claim 12, wherein the status acquisition apparatus includes a motion monitoring unit, and wherein the method comprises:

acquiring data via the motion monitoring unit; and transmitting, via the communication interface, the data acquired via the motion monitoring unit.

23. A method as recited in claim 22, wherein the transmitting of the data acquired via the motion monitoring unit is transmitted with the status update.

24. A method as recited in claim 22, wherein the transmitting of the data acquired via the motion monitoring unit includes speed data or direction of movement data of the status acquisition apparatus.

25. A method as recited in claim 22, wherein the transmitting of the data acquired via the motion monitoring unit includes vibration data or force data.

26. A method as recited in claim 12, wherein the status acquisition apparatus includes or couples to a battery, and wherein the method comprises:

determining whether a charge level or the battery is deemed low, and reducing how frequently the status updates are wirelessly transmitted when it is determined that the charge level of the battery is deemed low.

27. A method as recited in claim 26, wherein the determining whether the charge level of the battery is deemed low is based on a threshold level.

28. A non-transitory computer readable medium including at least computer program code tangibly stored thereon, the computer program code operating to acquire status updates from a plurality of portable, battery-powered status acquisition apparatus, each of the plurality of status acquisition apparatus including at least a position detection unit for acquiring position data and a communication interface for data communication over one or more wireless networks, the computer readable medium comprising:

computer program code for providing a graphical user interface configured to facilitate designation of a specified status update rate for status information to be received from a specified one or more of the plurality of status acquisition apparatus;

computer program code for sending a configuration request to the specified one or more of the plurality of status acquisition apparatus via at least the communication interface associated therewith, the configuration request requesting that status updates from the specified one or more of the plurality of status acquisition apparatus be provided in accordance with the specified status update rate, the configuration request denoting the specified status update rate to be utilized by the specified one or more of the plurality of status acquisition apparatus; and computer program code for receiving status updates from the specified one or more of the plurality of status acquisition apparatus via at least the communication interface associated therewith, the status updates being received from the specified one or more of the plurality of status acquisition apparatus after the configuration request has been sent thereto, and the status updates being received from the specified one or more of the plurality of status acquisition apparatus being in accordance with the specified status update rate, wherein, for a given one of the one or more of the plurality of status acquisition apparatus, the status updates being received therefrom include or are based on at least the position data acquired by the position detection unit of the given one of the one or more of the plurality of status acquisition apparatus.

29. A non-transitory computer readable medium as recited in claim 28, wherein the position detection unit comprises a GPS receiver.

30. A non-transitory computer readable medium as recited in claim 28, wherein each of the plurality of status acquisition apparatus are used to track location of an asset or object.

31. A non-transitory computer readable medium as recited in claim 30, wherein the status acquisition apparatus includes or couples to a battery, and wherein the method comprises:

determining whether a charge level of the battery is deemed low, and reducing how frequently the status updates are wirelessly transmitted when it is determined that the charge level of the battery is deemed low.

32. A method as recited in claim 31, wherein the determining whether the charge level of the battery is deemed low is based on a threshold level.

* * * * *

UNITED STATES PATENT AND TRADEMARK OFFICE

CERTIFICATE OF CORRECTION

PATENT NO. : 11,249,196 B2
APPLICATION NO. : 17/129726
DATED : February 15, 2022
INVENTOR(S) : Lau et al.

It is certified that error appears in the above-identified patent and that said Letters Patent is hereby corrected as shown below:

In the Claims

Column 21, Line 32 (Claim 12, Line 20), change “position” to --status--

Column 22, Line 42 (Claim 26, Line 4), change “or” to --of--

Signed and Sealed this
Thirteenth Day of February, 2024

Katherine Kelly Vidal

Katherine Kelly Vidal
*Director of the United States Patent and Trademark Office*